United States Patent
McGregor, Jr. et al.

(10) Patent No.: US 10,862,836 B2
(45) Date of Patent: *Dec. 8, 2020

(54) AUTOMATIC RESPONSE SUGGESTIONS BASED ON IMAGES RECEIVED IN MESSAGING APPLICATIONS

(71) Applicant: Google LLC, Mountain View, CA (US)

(72) Inventors: John Patrick McGregor, Jr., Menlo Park, CA (US); Ryan Cassidy, Seattle, WA (US); Ariel Fuxman, San Francisco, CA (US); Vivek Ramavajjala, Mountain View, CA (US); Sujith Ravi, Santa Clara, CA (US); Sergey Nazarov, Seattle, WA (US); Amit Fulay, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,815

(22) Filed: Sep. 4, 2019

(65) Prior Publication Data
US 2019/0394153 A1    Dec. 26, 2019

Related U.S. Application Data

(63) Continuation of application No. 16/003,661, filed on Jun. 8, 2018, now Pat. No. 10,412,030, which is a
(Continued)

(51) Int. Cl.
*H04L 12/58*    (2006.01)
*G06K 9/72*    (2006.01)
(Continued)

(52) U.S. Cl.
CPC ............. *H04L 51/10* (2013.01); *G06K 9/726* (2013.01); *H04L 51/02* (2013.01); *H04L 51/32* (2013.01);
(Continued)

(58) Field of Classification Search
CPC ............................... H04L 51/02; H04L 51/32
See application file for complete search history.

(56) References Cited

U.S. PATENT DOCUMENTS 5,963,649 A   10/1999   Sako
6,092,102 A   7/2000    Wagner
(Continued)

FOREIGN PATENT DOCUMENTS

CN    1475908    2/2004
CN    102222079   10/2011
(Continued)

OTHER PUBLICATIONS

Notice of Acceptance for Australian Patent Application No. 2015214298, dated Apr. 20, 2018, 3 pages.
(Continued)

*Primary Examiner* — Lashonda T Jacobs
(74) *Attorney, Agent, or Firm* — IP Spring

(57) ABSTRACT

Implementations relate to automatic response suggestions based on images received in messaging applications. In some implementations, a computer-executed method includes detecting a first image included within a first message received at a second device over a communication network from a first device of a first user, and programmatically analyzing the first image to extract a first image content. The method includes retrieving a first semantic concept associated with the first image content, programmatically generating a suggested response to the first message based on the first semantic concept, and transmitting instructions causing rendering of the suggested response in the messaging application as a suggestion to a second user of the second device.

20 Claims, 10 Drawing Sheets

Related U.S. Application Data continuation of application No. 15/709,418, filed on Sep. 19, 2017, now Pat. No. 10,015,124.

(60) Provisional application No. 62/397,315, filed on Sep. 20, 2016.

(51) Int. Cl.
   *G06K 9/62* (2006.01)
   *G06F 3/0484* (2013.01)

(52) U.S. Cl.
   CPC ........ *G06F 3/04842* (2013.01); *G06K 9/6202* (2013.01); *G06K 9/6215* (2013.01)

(56) References Cited

U.S. PATENT DOCUMENTS

| | | | |
|---|---|---|---|
| 7,603,413 B1 | 10/2009 | Herold et al. | |
| 8,266,109 B1 | 9/2012 | Bilsborough | |
| 8,391,618 B1 | 3/2013 | Chuang et al. | |
| 8,423,577 B1 | 4/2013 | Lee et al. | |
| 8,515,958 B2 * | 8/2013 | Knight | G06F 16/353 707/737 |
| 8,554,701 B1 | 10/2013 | Dillard et al. | |
| 8,589,407 B2 | 11/2013 | Bhatia | |
| 8,645,697 B1 | 2/2014 | Emigh et al. | |
| 8,650,210 B1 | 2/2014 | Cheng et al. | |
| 8,688,698 B1 * | 4/2014 | Black | G06F 16/3322 707/732 |
| 8,700,480 B1 | 4/2014 | Fox et al. | |
| 8,825,474 B1 * | 9/2014 | Zhai | G06F 3/04886 704/9 |
| 8,938,669 B1 | 1/2015 | Cohen | |
| 8,996,639 B1 | 3/2015 | Faaborg et al. | |
| 9,020,956 B1 | 4/2015 | Barr et al. | |
| 9,043,407 B1 | 5/2015 | Gaulke et al. | |
| 9,191,786 B2 * | 11/2015 | Davis | H04L 51/20 |
| 9,213,941 B2 | 12/2015 | Petersen | |
| 9,230,241 B1 | 1/2016 | Singh et al. | |
| 9,262,517 B2 | 2/2016 | Feng et al. | |
| 9,330,110 B2 * | 5/2016 | Lin | G06N 20/00 |
| 9,467,435 B1 | 10/2016 | Tyler et al. | |
| 9,560,152 B1 | 1/2017 | Jamdar et al. | |
| 9,600,724 B2 | 3/2017 | Ko et al. | |
| 9,674,120 B2 * | 6/2017 | Davis | H04L 67/306 |
| 9,715,496 B1 * | 7/2017 | Sapoznik | G06F 16/245 |
| 9,805,371 B1 * | 10/2017 | Sapoznik | G06F 40/216 |
| 9,807,037 B1 * | 10/2017 | Sapoznik | G06F 40/216 |
| 9,817,813 B2 * | 11/2017 | Faizakof | G06F 40/30 |
| 9,973,705 B2 | 5/2018 | Kinugawa et al. | |
| 10,129,193 B2 | 11/2018 | Mahmoud et al. | |
| 10,146,748 B1 | 12/2018 | Barndollar et al. | |
| 10,146,768 B2 * | 12/2018 | Fuxman | G06K 9/00671 |
| 10,404,636 B2 | 9/2019 | Rodriguez et al. | |
| 10,412,030 B2 | 9/2019 | McGregor et al. | |
| 10,440,279 B2 | 10/2019 | Ko et al. | |
| 10,547,574 B2 * | 1/2020 | Pham | G06F 40/56 |
| 2002/0040297 A1 | 4/2002 | Tsiao et al. | |
| 2003/0105589 A1 | 6/2003 | Liu et al. | |
| 2003/0182374 A1 | 9/2003 | Haldar | |
| 2005/0146621 A1 | 7/2005 | Tanaka et al. | |
| 2006/0004685 A1 | 1/2006 | Pyhalammi et al. | |
| 2006/0021023 A1 | 1/2006 | Stewart et al. | |
| 2006/0029106 A1 | 2/2006 | Ott et al. | |
| 2006/0150119 A1 | 7/2006 | Chesnais et al. | |
| 2006/0156209 A1 | 7/2006 | Matsuura et al. | |
| 2006/0172749 A1 | 8/2006 | Sweeney | |
| 2007/0030364 A1 | 2/2007 | Obrador et al. | |
| 2007/0094217 A1 | 4/2007 | Ronnewinkel | |
| 2007/0162942 A1 | 7/2007 | Hamynen et al. | |
| 2007/0244980 A1 | 10/2007 | Baker et al. | |
| 2008/0120371 A1 | 5/2008 | Gopal | |
| 2008/0153526 A1 | 6/2008 | Othmer | |
| 2009/0007019 A1 | 1/2009 | Kobayashi et al. | |
| 2009/0076795 A1 | 3/2009 | Bangalore et al. | |
| 2009/0119584 A1 | 5/2009 | Herbst | |
| 2009/0282114 A1 * | 11/2009 | Feng | G06Q 10/107 709/206 |
| 2009/0327436 A1 | 12/2009 | Chen | |
| 2010/0118115 A1 | 5/2010 | Takahashi et al. | |
| 2010/0228590 A1 | 9/2010 | Muller et al. | |
| 2010/0260426 A1 | 10/2010 | Huang et al. | |
| 2011/0074685 A1 | 3/2011 | Causey et al. | |
| 2011/0098056 A1 | 4/2011 | Rhoads | |
| 2011/0107223 A1 | 5/2011 | Tilton et al. | |
| 2011/0145068 A1 | 6/2011 | King et al. | |
| 2011/0164163 A1 | 7/2011 | Bilbrey et al. | |
| 2011/0212717 A1 | 9/2011 | Rhoads et al. | |
| 2011/0221912 A1 | 9/2011 | Yoshizawa | |
| 2011/0252108 A1 | 10/2011 | Morris et al. | |
| 2011/0252207 A1 | 10/2011 | Janosik, Jr. et al. | |
| 2012/0030289 A1 | 2/2012 | Buford et al. | |
| 2012/0033876 A1 | 2/2012 | Momeyer et al. | |
| 2012/0041941 A1 | 2/2012 | King et al. | |
| 2012/0041973 A1 | 2/2012 | Kim et al. | |
| 2012/0042036 A1 | 2/2012 | Lau et al. | |
| 2012/0089847 A1 | 4/2012 | Tu et al. | |
| 2012/0131520 A1 | 5/2012 | Tang et al. | |
| 2012/0179717 A1 | 7/2012 | Kennedy et al. | |
| 2012/0224743 A1 | 9/2012 | Rodriguez et al. | |
| 2012/0245944 A1 | 9/2012 | Gruber et al. | |
| 2012/0278164 A1 | 11/2012 | Spivack et al. | |
| 2012/0322428 A1 | 12/2012 | Lupoli et al. | |
| 2013/0036162 A1 | 2/2013 | Koenigs | |
| 2013/0050507 A1 | 2/2013 | Syed et al. | |
| 2013/0061148 A1 | 3/2013 | Das et al. | |
| 2013/0073366 A1 | 3/2013 | Heath | |
| 2013/0260727 A1 | 10/2013 | Knudson et al. | |
| 2013/0262574 A1 | 10/2013 | Cohen | |
| 2013/0346235 A1 | 12/2013 | Lam | |
| 2014/0004889 A1 | 1/2014 | Davis | |
| 2014/0035846 A1 | 2/2014 | Lee et al. | |
| 2014/0047413 A1 | 2/2014 | Shelve et al. | |
| 2014/0067371 A1 | 3/2014 | Liensberger | |
| 2014/0088954 A1 | 3/2014 | Shirzadi et al. | |
| 2014/0108562 A1 | 4/2014 | Panzer | |
| 2014/0150068 A1 | 5/2014 | Janzer | |
| 2014/0163954 A1 * | 6/2014 | Joshi | G06F 3/0237 704/9 |
| 2014/0164506 A1 | 6/2014 | Tesch et al. | |
| 2014/0171133 A1 | 6/2014 | Stuttle et al. | |
| 2014/0189027 A1 | 7/2014 | Zhang et al. | |
| 2014/0189538 A1 | 7/2014 | Martens et al. | |
| 2014/0201675 A1 | 7/2014 | Joo et al. | |
| 2014/0228009 A1 | 8/2014 | Chen et al. | |
| 2014/0232889 A1 | 8/2014 | King et al. | |
| 2014/0237057 A1 | 8/2014 | Khodorenko | |
| 2014/0317030 A1 | 10/2014 | Shen et al. | |
| 2014/0337438 A1 | 11/2014 | Govande et al. | |
| 2014/0344058 A1 | 11/2014 | Brown | |
| 2014/0372349 A1 | 12/2014 | Driscoll | |
| 2014/0372540 A1 | 12/2014 | Libin | |
| 2015/0006143 A1 | 1/2015 | Skiba et al. | |
| 2015/0026101 A1 * | 1/2015 | Lin | G06N 5/025 706/12 |
| 2015/0032724 A1 | 1/2015 | Thirugnanasundaram et al. | |
| 2015/0058720 A1 | 2/2015 | Smadja et al. | |
| 2015/0095855 A1 | 4/2015 | Bai et al. | |
| 2015/0100537 A1 | 4/2015 | Grieves et al. | |
| 2015/0171133 A1 | 6/2015 | Kim et al. | |
| 2015/0178371 A1 | 6/2015 | Seth et al. | |
| 2015/0178388 A1 | 6/2015 | Winnemoeller et al. | |
| 2015/0207765 A1 * | 7/2015 | Brantingham | H04L 51/046 715/758 |
| 2015/0220806 A1 | 8/2015 | Heller et al. | |
| 2015/0227797 A1 | 8/2015 | Ko et al. | |
| 2015/0248411 A1 * | 9/2015 | Krinker | G06F 16/24578 707/748 |
| 2015/0250936 A1 | 9/2015 | Thomas et al. | |
| 2015/0286371 A1 | 10/2015 | Degani | |
| 2015/0288633 A1 | 10/2015 | Ogundokun et al. | |
| 2015/0302301 A1 | 10/2015 | Petersen | |
| 2015/0370830 A1 | 12/2015 | Murphy-Chutorian et al. | |

(56) References Cited

U.S. PATENT DOCUMENTS

| | | | |
|---|---|---|---|
| 2016/0037311 A1* | 2/2016 | Cho | G06Q 10/00 |
| | | | 455/466 |
| 2016/0042252 A1* | 2/2016 | Sawhney | G06F 16/55 |
| | | | 382/190 |
| 2016/0043817 A1 | 2/2016 | Handoush et al. | |
| 2016/0043974 A1 | 2/2016 | Purcell et al. | |
| 2016/0072737 A1 | 3/2016 | Forster | |
| 2016/0092044 A1 | 3/2016 | Laska et al. | |
| 2016/0140447 A1* | 5/2016 | Cohen | G06N 5/048 |
| | | | 706/52 |
| 2016/0140477 A1 | 5/2016 | Karanam et al. | |
| 2016/0162791 A1 | 6/2016 | Petersen | |
| 2016/0179816 A1* | 6/2016 | Glover | G06F 16/24578 |
| | | | 707/749 |
| 2016/0210279 A1 | 7/2016 | Kim et al. | |
| 2016/0224524 A1 | 8/2016 | Kay et al. | |
| 2016/0226804 A1 | 8/2016 | Hampson et al. | |
| 2016/0234553 A1 | 8/2016 | Hampson et al. | |
| 2016/0283454 A1 | 9/2016 | Leydon et al. | |
| 2016/0284011 A1 | 9/2016 | Dong et al. | |
| 2016/0342895 A1 | 11/2016 | Gao et al. | |
| 2016/0350304 A1* | 12/2016 | Aggarwal | G10L 15/26 |
| 2016/0378080 A1 | 12/2016 | Uppala et al. | |
| 2017/0017648 A1 | 1/2017 | Pearlman et al. | |
| 2017/0075878 A1 | 3/2017 | Jon et al. | |
| 2017/0093769 A1 | 3/2017 | Lind et al. | |
| 2017/0098122 A1 | 4/2017 | el Kaliouby et al. | |
| 2017/0134316 A1 | 5/2017 | Cohen et al. | |
| 2017/0142046 A1 | 5/2017 | Mahmoud et al. | |
| 2017/0149703 A1 | 5/2017 | Willett et al. | |
| 2017/0153792 A1 | 6/2017 | Kapoor et al. | |
| 2017/0171117 A1* | 6/2017 | Carr | H04L 51/16 |
| 2017/0180276 A1* | 6/2017 | Gershony | H04L 51/18 |
| 2017/0180294 A1* | 6/2017 | Milligan | H04L 51/02 |
| 2017/0187654 A1 | 6/2017 | Lee | |
| 2017/0250930 A1 | 8/2017 | Ben-Itzhak | |
| 2017/0250935 A1 | 8/2017 | Rosenberg | |
| 2017/0250936 A1 | 8/2017 | Rosenberg et al. | |
| 2017/0288942 A1 | 10/2017 | Plumb et al. | |
| 2017/0293834 A1 | 10/2017 | Raison et al. | |
| 2017/0308589 A1 | 10/2017 | Liu et al. | |
| 2017/0324868 A1 | 11/2017 | Tamblyn et al. | |
| 2017/0344224 A1 | 11/2017 | Kay et al. | |
| 2017/0357442 A1 | 12/2017 | Peterson et al. | |
| 2017/0366479 A1 | 12/2017 | Ladha et al. | |
| 2018/0004397 A1 | 1/2018 | Mazzocchi | |
| 2018/0005272 A1 | 1/2018 | Todasco et al. | |
| 2018/0012231 A1 | 1/2018 | Sapoznik et al. | |
| 2018/0013699 A1 | 1/2018 | Sapoznik et al. | |
| 2018/0032499 A1* | 2/2018 | Hampson | G06F 40/253 |
| 2018/0032997 A1 | 2/2018 | Gordon et al. | |
| 2018/0060705 A1 | 3/2018 | Mahmoud et al. | |
| 2018/0083894 A1* | 3/2018 | Fung | H04L 51/08 |
| 2018/0083898 A1 | 3/2018 | Pham | |
| 2018/0083901 A1 | 3/2018 | McGregor et al. | |
| 2018/0090135 A1 | 3/2018 | Schlesinger et al. | |
| 2018/0109526 A1* | 4/2018 | Fung | H04L 63/168 |
| 2018/0137097 A1* | 5/2018 | Lim | G06F 40/279 |
| 2018/0196854 A1 | 7/2018 | Burks | |
| 2018/0210874 A1* | 7/2018 | Fuxman | G06F 40/35 |
| 2018/0227498 A1 | 8/2018 | Ko et al. | |
| 2018/0293601 A1 | 10/2018 | Glazier | |
| 2018/0309706 A1* | 10/2018 | Kim | H04L 51/10 |
| 2018/0316637 A1 | 11/2018 | Desjardins | |
| 2018/0322403 A1* | 11/2018 | Ron | H04L 51/16 |
| 2018/0336226 A1 | 11/2018 | Anorga et al. | |
| 2018/0336415 A1 | 11/2018 | Anorga et al. | |
| 2018/0367483 A1* | 12/2018 | Rodriguez | H04L 51/046 |
| 2018/0367484 A1* | 12/2018 | Rodriguez | H04L 67/36 |
| 2018/0373683 A1 | 12/2018 | Hullette et al. | |

FOREIGN PATENT DOCUMENTS

| | | |
|---|---|---|
| CN | 102395966 | 3/2012 |
| CN | 102467574 | 5/2012 |
| CN | 103226949 | 7/2013 |
| CN | 103548025 | 1/2014 |
| EP | 1376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 3091445 | 11/2016 |
| JP | 2000-298676 | 10/2000 |
| JP | 2002-132804 | 5/2002 |
| JP | 2012-027950 | 2/2012 |
| JP | 2012-221480 | 11/2012 |
| JP | 2014-86088 | 5/2014 |
| JP | 2014-142919 | 8/2014 |
| JP | 2014-170397 | 9/2014 |
| JP | 2015-531136 | 10/2015 |
| KR | 20110003462 | 1/2011 |
| KR | 20130008036 | 1/2013 |
| KR | 10-2013-0050871 | 5/2013 |
| KR | 20130061387 | 6/2013 |
| KR | 1020150037935 | 4/2015 |
| KR | 10-2015-0108096 | 9/2015 |
| KR | 10-2017-0032883 | 3/2017 |
| WO | 2004104758 | 12/2004 |
| WO | 2011002989 | 1/2011 |
| WO | 2015183493 | 12/2015 |
| WO | 2016130788 | 8/2016 |
| WO | 2016204428 | 12/2016 |
| WO | 2018089109 | 5/2018 |

OTHER PUBLICATIONS

Examination Report No. 1 for Australian Patent Application No. 2015214298, dated Apr. 24, 2017, 3 pages.
Examination Report No. 2 for Australian Patent Application No. 2015214298, dated Nov. 2, 2017, 3 pages.
International Search Report and Written Opinion for International Patent Application No. PCT/US2015/014414, dated May 11, 2015, 8 pages.
Blippar, , "Computer Vision API", www.web.blippar.com/computer-vision-api, 4 pages.
Chen, et al., "A Survey of Document Image Classification: problem statement, classifier architecture and performance evaluation", International Journal of Document Analysis and Recognition (IJDAR), vol. 10, No. 1, Aug. 3, 2006, pp. 1-16.
Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.
CNIPA, First Office Action for Chinese Patent Application No. 201580016692.1, dated Nov. 2, 2018, 7 pages.
EPO, International Search Report and Written Opinion for PCT Application No. PCT/US2017/046858, dated Oct. 11, 2017, 10 Pages.
EPO, Written Opinion of the International Preliminary Examining Authority for International Patent Application No. PCT/US2018/021028, dated Jun. 14, 2019, 11 pages.
EPO, International Search Report and Written Opinion for International Patent Application No. PCT/US2016/068083, dated Mar. 9, 2017, 13 pages.
EPO, International Search Report for International Patent Application No. PCT/US2017/052713, dated Dec. 5, 2017, 4 Pages.
EPO, International Search Report for International Patent Application No. PCT/US2016/068083, dated Mar. 9, 2017, 4 pages.
EPO, International Search Report for International Patent Application No. PCT/US2018/022501, dated May 14, 2018, 4 pages.
EPO, Communication Pursuant to Article 94(3) EPC for European Patent Application No. 16825663.4, dated Apr. 16, 2019, 5 pages.
EPO, International Search Report for International Patent Application No. PCT/US2017/052349, dated Dec. 13, 2017, 5 pages.

(56) References Cited

OTHER PUBLICATIONS

EPO, International Search Report for International Patent Application No. PCT/US2017/057044, dated Jan. 18, 2018, 5 pages.
EPO, Written Opinion for International Patent Application No. PCT/US2017/052713, dated Dec. 5, 2017, 6 Pages.
EPO, Communication Pursuant to Article 94(3) EPC for European Patent Application No. 16825666.7, dated Apr. 23, 2019, 6 pages.
EPO, International Search Report for International Patent Application No. PCT/US2018/022503, dated Aug. 16, 2018, 6 pages.
EPO, Written Opinion for International Patent Application No. PCT/US2017/052349, dated Dec. 13, 2017, 6 pages.
EPO, Written Opinion for International Patent Application No. PCT/US2018/022501, dated May 14, 2018, 6 pages.
EPO, Written Opinion of the International Preliminary Examining Authority for International Patent Application No. PCT/US2017/052713, dated Oct. 15, 2018, 6 pages.
EPO, Extended European Search Report for European Patent Application No. 15746410.8, dated Sep. 5, 2017, 7 pages.
EPO, Written Opinion for International Patent Application No. PCT/US2018/022503, dated Aug. 16, 2018, 8 pages.
EPO, Written Opinion of the International Preliminary Examination Authority for International Patent Application No. PCT/US2017/057044, dated Dec. 20, 2018, 8 pages.
EPO, Written Opinion for International Patent Application No. PCT/US2017/057044, dated Jan. 18, 2018, 8 pages.
EPO, Written Opinion of the International Preliminary Examining Authority for International Patent Application No. PCT/US2017/052349, dated Aug. 6, 2018, 9 pages.
EPO, Written Opinion for International Patent Application No. PCT/US2016/068083, dated Mar. 9, 2017, 9 pages.
Fuxman, Ariel , ""Aw, so cute!": Allo helps you respond to shared photos", Google Research Blog, https://research.googleblog.com/2016/05/aw-so-cute-allo-helps-you-respond-to.html, May 18, 2016, 6 pages.
International Bureau of WIPO, International Preliminary Report on Patentability for International Patent Application No. PCT/US2017/046858, dated Feb. 19, 2019, 7 pages.
International Bureau of WIPO, International Preliminary Report on Patentability for International Patent Application No. PCT/US2017/052349, dated Mar. 26, 2019, 7 pages.
International Bureau of WIPO, International Preliminary Report on Patentability for International Patent Application No. PCT/US2017/057044, dated Jul. 30, 2019, 9 pages.
International Bureau of WIPO, International Preliminary Report on Patentability for International Patent Application No. PCT/US2016/068083, dated Jul. 5, 2018, 9 pages.
JPO, Office Action for Japanese Patent Application No. 2018-551908, dated Aug. 20, 2019, 4 pages.
JPO, Office Action for Japanese Patent Application No. 2018-532399, dated Jul. 23, 2019, 6 pages.
Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.
Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.
KIPO, Notice of Preliminary Rejection for Korean Patent Application No. 10-2019-7011687, dated May 7, 2019, 3 pages.
KIPO, Notice of Final Rejection for Korean Patent Application No. 10-2018-7013953, dated Jun. 13, 2019, 4 pages.
KIPO, Notice of Final Rejection for Korean Patent Application No. 10-2018-7013953, dated May 8, 2019, 4 pages.
KIPO, Preliminary Rejection for Korean Patent Application No. 10-2018-7013953, dated Oct. 29, 2018, 5 pages.
KIPO, Notice of Preliminary Rejection for Korean Patent Application No. 10-2018-7019756, dated May 13, 2019, 9 pages.
KIPO, Notice of Preliminary Rejection for Korean Patent Application No. 10-2019-7024479, dated Sep. 18, 2019, 9 pages.
Lardinois, F. "Allo brings Google's smarts to messaging", https://techcrunch.com/2016/09/20/allo-brings-googles-smarts-to-messaging/, Sep. 2016, 14 pages.
Lee, Jang Ho et al., "Supporting multi-user, multi-applet workspaces in CBE", Proceedings of the 1996 ACM conference on Computer supported cooperative work, ACM, Nov. 16, 1996, 10 pages.
Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.
PCT, "International Search Report and Written Opinion for International Application No. PCT/US2018/021028", dated Jun. 15, 2018, 11 Pages.
Pieterse, et al., "Android botnets on the rise: trends and characteristics", 2012 Information Security for South Africa, Aug. 15-17, 2012, 5 pages.
Pinterest, , "Pinterest Lens", www.help.pinterest.com/en/articles/pinterest-lens, 2 pages.
Russell, , "Google Allo is the Hangouts Killer We've Been Waiting For", Retrieved from the Internet: http://web.archive.org/web/20160519115534/https://www.technobuffalo.com/2016/05/18/google-allo-hangouts-replacement/, May 18, 2016, 3 pages.
USPTO, Non-final Office Action for U.S. Appl. No. 15/386,162, dated Nov. 27, 2018, 11 Pages.
USPTO, Non-final Office Action for U.S. Appl. No. 15/386,162, dated Nov. 27, 2018, 12 pages.
USPTO, Non-final Office Action for U.S. Appl. No. 15/386,760, dated Oct. 11, 2019, 12 pages.
USPTO, Final Office Action for U.S. Appl. No. 15/386,162, dated Jun. 5, 2019, 13 pages.
USPTO, Final Office Action for U.S. Appl. No. 15/386,760, dated May 30, 2019, 13 pages.
USPTO, Final Office Action for U.S. Appl. No. 15/238,304, dated Nov. 23, 2018, 14 pages.
USPTO, Non-final Office Action for U.S. Appl. No. 15/709,418, dated Nov. 21, 2017, 15 pages.
USPTO, First Action Interview, Office Action Summary for U.S. Appl. No. 16/003,661, dated Dec. 14, 2018, 16 pages.
USPTO, Non-final Office Action for U.S. Appl. No. 15/238,304, dated Jun. 7, 2018, 17 pages.
USPTO, Notice of Allowance for U.S. Appl. No. 15/624,638, dated Feb. 28, 2019, 21 Pages.
USPTO, Non-final Office Action for U.S. Appl. No. 15/709,423, dated May 2, 2019, 21 Pages.
USPTO, Non-final Office Action for U.S. Appl. No. 14/618,962, dated Feb. 26, 2016, 25 pages.
USPTO, Non-final Office Action for U.S. Appl. No. 15/428,821, dated May 18, 2017, 30 pages.
USPTO, First Action Interview, Pre-Interview Communication for U.S. Appl. No. 15/709,440, dated May 16, 2019, 4 pages.
USPTO, First Action Interview, Pre-Interview Communication for U.S. Appl. No. 15/624,637, dated Oct. 19, 2018, 4 pages.
USPTO, First Action Interview, Office Action Summary for U.S. Appl. No. 15/350,040, dated Oct. 30, 2018, 4 pages.
USPTO, Non-final Office Action for U.S. Appl. No. 15/946,342, dated Jul. 26, 2018, 40 pages.
USPTO, First Action Interview, Pre-Interview Communication for U.S. Appl. No. 15/415,506, dated Apr. 5, 2018, 5 pages.
USPTO, First Action Interview, Office Action Summary for U.S. Appl. No. 15/624,637, dated Jan. 25, 2019, 5 pages.
USPTO, First Action Interview, Pre-Interview Communication for U.S. Appl. No. 15/350,040, dated Jul. 16, 2018, 5 pages.
USPTO, First Action Interview, Pre-Interview Communication for U.S. Appl. No. 15/386,760, dated Nov. 6, 2018, 5 pages.
USPTO, First Action Interview, Pre-Interview Communication for U.S. Appl. No. 16/003,661, dated Aug. 29, 2018, 6 pages.
USPTO, First Action Interview, Office Action Summary for U.S. Appl. No. 15/386,760, dated Jan. 30, 2019, 8 pages.
USPTO, Non-final Office Action for Design U.S. Appl. No. 29/503,386, dated Feb. 1, 2016, 9 pages.
Vinyals, O. et al., "Show and Tell: A Neural Image Caption Generator", arXiv:1411.4555v2 [cs.CV], Apr. 20, 2015, pp. 1-9.

(56) References Cited

OTHER PUBLICATIONS

WIPO, International Preliminary Report on Patentability for International Patent Application No. PCT/US2017/52333, dated Dec. 4, 2018, 15 pages.
WIPO, Written Opinion of the International Preliminary Examining Authority for International Patent Application No. PCT/US2017/52333, dated Aug. 17, 2018, 5 pages.
WIPO, "International Search Report and Written Opinion PCT application No. PCT/US2017/052333", dated Nov. 30, 2017, 15 pages.
Yeh, et al., "Searching the web with mobile images for location recognition", Proceedings of the 2004 IEEE Computer Society Conference on Pattern Recognition, vol. 2, Jun.-Jul. 2004, pp. 1-6.
Zhao, et al., "Cloud-based push-styled mobile botnets: a case study of exploiting the cloud to device messaging service", Proceedings ACSAC '12, Proceedings of the 28th Annual Computer Security Applications Conference, ACM Digital Library, Dec. 3, 2012, pp. 119-128.
WIPO, International Preliminary Report on Patentability for International Patent Application No. PCT/US2018/022501, dated Dec. 17, 2019, 7 pages.
WIPO, International Preliminary Report on Patentability for International Patent Application No. PCT/US2018/022503, dated Dec. 17, 2019, 9 pages.
WIPO, International Preliminary Report on Patentability for International Patent Application No. PCT/US2018/021028, dated Nov. 28, 2019, 10 pages.
JPO, Notice of Allowance (with English translation) for Japanese Patent Application No. 2018-551908, dated Dec. 3, 2019, 2 pages.
JPO, Notice of Allowance (with English translation) for Japanese Patent Application No. 2019-520680, dated Nov. 12, 2019, 2 pages.
KIPO, Notice of Preliminary Rejection (with English translation) for Korean Patent Application No. 10-2019-7020465, dated Jan. 10, 2020, 9 pages.
KIPO, Notice of Allowance (with English translation) for Korean Patent Application No. 10-2019-7024479, dated Jan. 17, 2020, 4 pages.
KIPO, Notice of Final Rejection for Korean Patent Application No. 10-2018-7019756, dated Jan. 17, 2020, 4 pages.
KIPO, Notice of Final Rejection for Korean Patent Application No. 10-2018-7019756, dated Nov. 25, 2019, 3 pages.
USPTO, Final Office Action for U.S. Appl. No. 15/386,760, dated Jan. 10, 2020, 12 pages.
USPTO, First Action Interview, Pre-Interview Communication for U.S. Appl. No. 15/912,796, dated Jan. 8, 2020, 5 pages.
USPTO, First Action Interview, Pre-Interview Communication for U.S. Appl. No. 15/912,809, dated Nov. 22, 2019, 5 pages.
JPO, Office Action for Japanese Patent Application No. 2019-547462, dated Feb. 18, 2020, 6 pages.
JPO, Office Action for Japanese Patent Application No. 2018-532399, dated Mar. 10, 2020, 4 pages.
USPTO, Notice of Allowance for U.S. Appl. No. 15/386,760, dated Apr. 24, 2020, 9 pages.
USPTO, First Action Interview, Office Action Summary for U.S. Appl. No. 15/912,809, dated Feb. 18, 2020, 18 pages.
USPTO, Notice of Allowance for U.S. Appl. No. 16/569,273, dated Feb. 20, 2020, 17 pages.
USPTO, First Action Interview, Office Action Summary for U.S. Appl. No. 15/912,796, dated Mar. 13, 2020, 5 pages.
USPTO, Non-final Office Action for U.S. Appl. No. 16/569,273, dated Oct. 18, 2019, 21 pages.
EPO, Communication Pursuant to Article 94(3) EPC for European Patent Application No. 17794825.4, dated Aug. 4, 2020, 8 pages.
JPO, Office Action (with English translation) for Japanese Patent Application No. 2019-518995, dated Jul. 28, 2020, 5 pages.
USPTO, First Action Interview, Pre-Interview Communication for U.S. Appl. No. 16/436,632, dated Aug. 14, 2020, 5 pages.
KIPO, Notice of Allowance (with English translation) for Korean Patent Application No. 10-2019-7020465, dated Aug. 5, 2020, 5 pages.
CNIPA, First Office Action for Chinese Patent Application No. 201680070359.3, dated Jun. 3, 2020, 9 pages.
EPO, Communication Pursuant to Article 94(3) EPC for European Patent Application No. 18716399.3, dated Jul. 3, 2020, 6 pages.
EPO, Communication Pursuant to Article 94(3) EPC for European Patent Application No. 16825666.7, dated Jun. 18, 2020, 6 pages.
EPO, Communication Pursuant to Article 94(3) EPC for European Patent Application No. 16825663.4, dated May 7, 2020, 5 pages.
IPO, First Examination Report for Indian Patent Application No. 201847014172, dated Jun. 17, 2020, 7 pages.
JPO, Office Action for Japanese Patent Application No. 2018-532399, dated Jun. 16, 2020, 3 pages.
JPO, Notice of Allowance (including English translation) for Japanese Patent Application No. 2019-547462, dated May 28, 2020, 2 pages.
KIPO, Notice of Final Rejection for Korean Patent Application No. 10-2019-7020465, dated Jun. 29, 2020, 4 pages.
USPTO, Final Office Action for U.S. Appl. No. 15/912,809, dated Jun. 24, 2020, 8 pages.

* cited by examiner

… (1)

AUTOMATIC RESPONSE SUGGESTIONS BASED ON IMAGES RECEIVED IN MESSAGING APPLICATIONS

CROSS REFERENCE TO RELATED APPLICATIONS

The present application is a continuation of U.S. patent application Ser. No. 16/003,661, now U.S. Pat. No. 10,412,030, filed Jun. 8, 2018 and titled AUTOMATIC RESPONSE SUGGESTIONS BASED ON IMAGES RECEIVED IN MESSAGING APPLICATIONS, which is a continuation of U.S. patent application Ser. No. 15/709,418, filed Sep. 19, 2017 and titled AUTOMATIC RESPONSE SUGGESTIONS BASED ON IMAGES RECEIVED IN MESSAGING APPLICATIONS (now U.S. Pat. No. 10,015,124), which claims priority to U.S. Provisional Patent Application No. 62/397,315, filed Sep. 20, 2016 and titled AUTOMATIC RESPONSE SUGGESTIONS BASED ON IMAGES RECEIVED IN MESSAGING APPLICATIONS, all of which are incorporated herein by reference in their entirety.

BACKGROUND

The popularity and convenience of digital devices as well as the widespread of use of Internet communications have caused communications between user devices to become ubiquitous. For example, users commonly use their devices to send electronic messages to other users as text messages, chat messages, email, etc. Users may send images in messages to other users to provide receiving users with visual content.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatic response suggestions based on images received in messaging applications. In some implementations, a computer-executed method includes detecting a first image included within a first message received at a second device over a communication network from a first device of a first user, and programmatically analyzing the first image to extract a first image content. The method includes retrieving a first semantic concept associated with the first image content, programmatically generating a suggested response to the first message based on the first semantic concept, and transmitting instructions causing rendering of the suggested response in the messaging application as a suggestion to a second user of the second device.

Various implementations and examples of the method are described, which can be combined in various implementations as well. For example, in some implementations, the method further includes, upon receiving a selection of the suggested response based on input received from the second user, transmitting the suggested response over the communication network to a device of the first user as a response to the first message. In some implementations, the method further includes detecting a first textual content within the first message, where the suggested response is generated further based on the first textual content of the first message.

The first textual content is programmatically analyzed in some implementations to retrieve a second semantic concept, where the suggested response is generated further based on the second semantic concept.

In some examples, the suggested response includes a second image. In some of these examples, the method further includes determining that a third semantic concept is associated with the first semantic concept, programmatically retrieving a second image content associated with the third semantic concept, and selecting the second image for the suggested response based on the second image having the second image content. In some implementations, the suggested response includes second textual content, and the method further includes determining that a fourth semantic concept is associated with the first semantic concept, and determining the second textual content based on an association of the second textual content with the fourth semantic concept.

In some implementations, retrieving the first semantic concept includes querying a hierarchical taxonomy of concepts based on the first image content. In some implementations, programmatically generating the suggested response includes generating the suggested response using one or more of a graph-based learning model and a grammar-based model. In some implementations, programmatically generating the suggested response further includes determining a respective score for one or more of a plurality of suggested responses that include the suggested response, and selecting the suggested response based on the respective scores for the one or more of the plurality of suggested responses.

In some implementations, a non-transitory computer readable medium has stored thereon software instructions that, when executed by a processor, cause the processor to automatically suggest content in a messaging application by performing operations. The operations include posting, within the messaging application displayed on a second device, a first message including a first image transmitted by a first device of a first user. The operations include programmatically generating one or more suggested responses to the first message, based on a first semantic concept associated with a first image content in the first image, transmitting instructions causing rendering of at least one suggested response of the one or more suggested responses in the messaging application as one or more suggestions to a second user, and receiving a selection of a selected suggested response of the at least one suggested response in the messaging application based on user input provided by the second user of the second device.

Various implementations and examples of the computer readable medium are described, which can be combined in various implementations as well. For example, in some implementations, the operation of programmatically generating the one or more suggested responses includes generating the one or more suggested responses using one or more of a graph-based learning model and a grammar-based model. In some implementations, the operation of programmatically generating the one or more suggested responses includes programmatically generating a plurality of suggested responses, and wherein the operations further include determining a subset of the plurality of suggested responses, where transmitting instructions causing rendering of the at least one suggested response includes transmitting instructions causing rendering of the subset of the plurality of suggested responses. In some implementations, the operation of programmatically generating the one or more suggested responses is based on data indicating a plurality of previous user responses to a plurality of previous images, where the previous user responses are filtered to be statistically associated with the plurality of previous images, and the statistically associated responses satisfy a threshold association score.

In some implementations, the at least one suggested response includes textual content, and the operations further includes determining that a second semantic concept is associated with the first semantic concept based on a predetermined relationship between the first semantic concept and the second semantic concept in a stored taxonomy, and determining the textual content based on an association of the textual content with the second semantic concept.

In some implementations, the operation of generating the at least one suggested response includes determining the one or more suggested responses using a stored graph providing relationships between a plurality of concept nodes representing concepts, a plurality of image nodes representing images, and a plurality of response nodes representing responses, where the first semantic concept is matched to a concept node and wherein the one or more suggested responses are determined based on strengths of connections between at least one of the concept nodes and at least one of the response nodes. In some examples, multiple image nodes of the plurality of image nodes are connected in the stored graph based on a visual similarity of image pixels between images represented by the multiple image nodes, and multiple response nodes of the plurality of response nodes are connected in the stored graph based on correlations between responses represented by the multiple response nodes, where the correlations include: similarity of the responses represented by the multiple response nodes, and/or frequency of occurrence of the responses represented by the multiple response nodes in response to images having particular concepts.

In some implementations, the operation of generating the at least one suggested response includes determining one or more of the suggested responses using a grammar-based model in which the first semantic concept is matched to one or more concepts in a stored taxonomy and one or more related concepts are determined in the stored taxonomy, and the one or more related concepts are input to one or more stored grammars associated with the one or more related concepts to generate the one or more suggested responses. In some examples, the one or more stored grammars each include one or more conditions to generate an associated suggested response, where the one or more conditions include at least one of a child relationship and parent relationship with the first semantic concept in a hierarchy of the stored taxonomy.

In some implementations, a system includes a memory and at least one processor configured to access the memory and configured to perform operations including posting, within the messaging application displayed on a second device, a first message including a first image transmitted by a first device of a first user. The operations include programmatically generating a suggested response to the first message, the suggested response generated based on a first semantic concept associated with a first image content in the first image. The operations include transmitting instructions causing rendering of the suggested response in the messaging application as a suggestion to a second user of the second device, receiving a selection of the suggested response in the messaging application based on user input provided by the second user of the second device, and transmitting the selected suggested response to the first device. Various implementations and examples, and combinations thereof, can include additional features similar to those described above.

DETAILED DESCRIPTION

Figure 1:
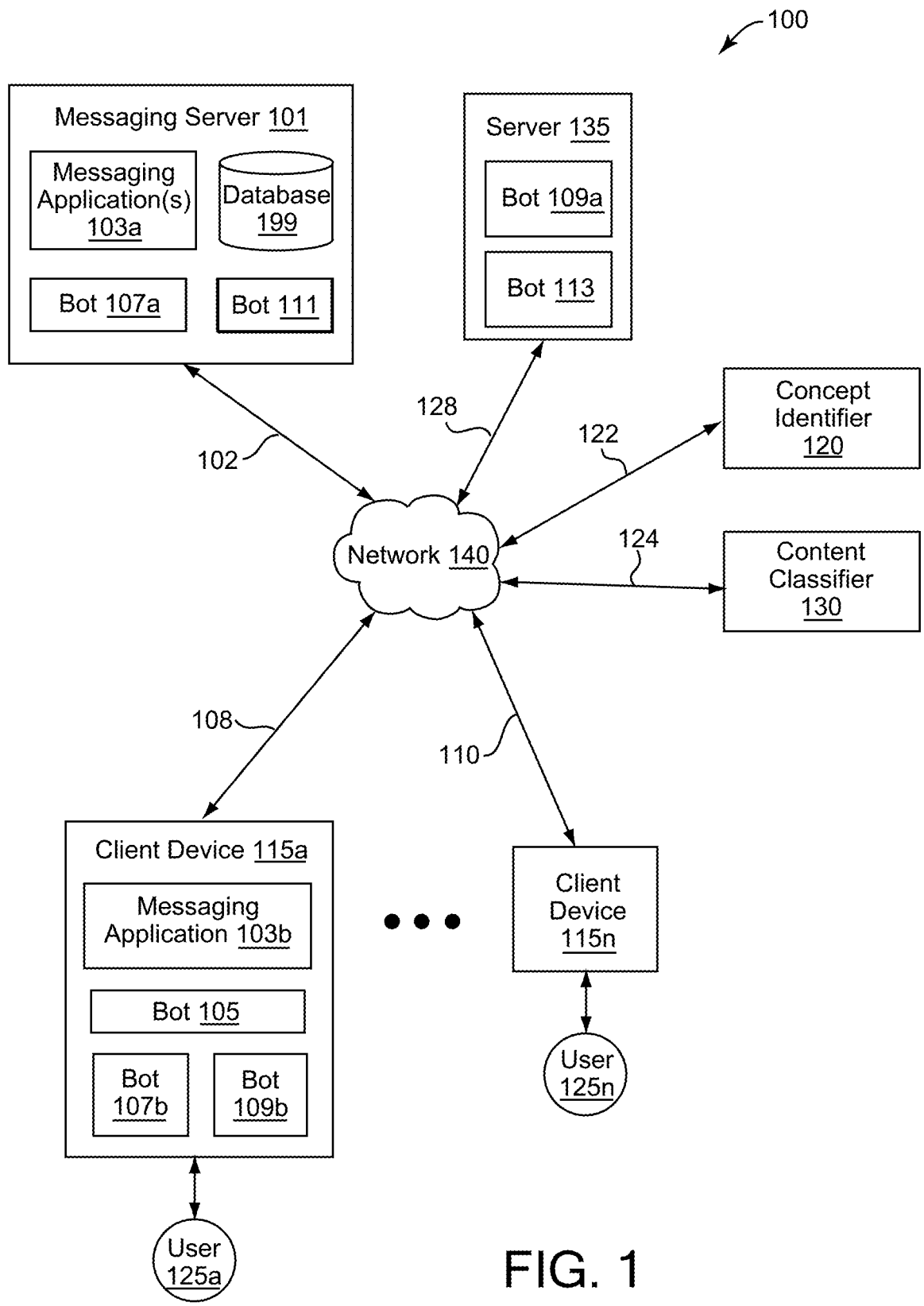
FIG. 1 is a block diagram of example systems and a network environment which may be used for one or more implementations described herein.

One or more implementations described herein relate to automatic suggested messages in messaging applications in response to receiving images. In some implementations, a receiving device detects an image included within a message received at the device over a communication network from a sending device of a sending user. The image is programmatically analyzed by the receiving device to extract image content, and the receiving device obtains one or more semantic concepts that are associated with the image content. One or more suggested responses to the message are programmatically generated based on at least one of the semantic concepts, and the suggested responses are rendered in the messaging application as suggestions to a user of the receiving device. In response to a suggested response being selected, e.g., by user input, the selected suggested response is transmitted to the sending device as a response to the message, e.g., to be displayed as a response message in the messaging application executed on the sending device.

In various implementations, the suggested response can be generated based on textual content in the received message that is associated with one or more of the semantic concepts. In some examples, a suggested response can be generated based on multiple semantic concepts determined in the content of the message. In further examples, additional semantic concept(s) can be determined that are associated with semantic concepts detected in the received message, and suggested responses can be based on the additional semantic concept(s). In some examples, an additional semantic concept is associated with a detected semantic concept based on a predetermined relationship between the additional semantic concept and the detected semantic concept in a stored taxonomy, and, e.g., textual content is provided in a suggested response based on an association of the textual content with the additional semantic concept. In further examples, one or more suggested responses can be or include images, e.g., images obtained from storage associated with the receiving user. In further examples, an image can be selected to be included in the suggested response based on the image having image content that is associated with one or more semantic concepts detected in the received message.

In some implementations, a subset of suggested responses are selected for presentation on the device based on scores determined for multiple suggested responses. In some implementations, suggested responses are generated based on stored data indicating a plurality of previous user responses to a plurality of previous images. In some examples, the previous user responses used to generate the suggested responses are filtered to be statistically associated with the plurality of previous images, e.g., the filtered statistically-associated responses satisfy a threshold association score. For example, machine-learning techniques can be used, where such stored data and/or filtered data is used as training data to train machine-learning models, and where the models are used to determine inferences as suggested responses to the received image.

In some examples, the semantic concepts can be obtained by querying a hierarchical taxonomy of concepts based on the received image content. A suggested response can be generated using one or more of a graph-based learning model and a grammar-based model. For example, a graph-based learning model can determine suggested responses using a stored graph providing relationships between concept nodes representing concepts, image nodes representing images, and response nodes representing responses, where a detected semantic concept of an image is matched to a concept node and suggested responses are determined based on strengths of connections between the concept nodes and the response nodes. In some examples, image nodes are connected in the stored graph based on a visual similarity of image pixels between images represented by the image nodes, and response nodes are connected in the stored graph based on correlations between responses represented by the response nodes, where the correlations include similarity of the responses of the response nodes and/or frequency of occurrence of the responses of the response nodes in association with particular concepts. In another example, suggested responses can be determined using a grammar-based model in which a detected semantic concept in an image is matched to concepts in a stored taxonomy and one or more related concepts are determined in the stored taxonomy, and wherein the related concepts are input to one or more stored grammars associated with the related concepts to generate suggested responses. The stored grammars can each include conditions to generate an associated suggested response, such as a child relationship and parent relationship with a semantic concept in a hierarchy of the stored taxonomy.

In some examples, at various times during a conversation between user devices, users may not be able to provide sufficient attention or focus to respond to received messages with pertinent responses, and/or may not be able to provide detailed user input to a device to create such pertinent responses. In some examples, a user may be performing an activity or be in an environment where appropriate responses are not possible or more difficult for the user to provide. One or more features described herein advantageously provide automatic message suggestions for a user in response to an image. For example, one or more suggested message responses are automatically suggested based on an image received in a messaging conversation between user devices, and the user may simply select a desired response from the suggestions for posting in the conversation. Such suggestions allow a user to simply and quickly respond to received images with reduced user input and reduced time to compose the responses on a device, thus reducing consumption of device resources that would otherwise be needed to enable and process added input from the user to compose responses and/or otherwise participate in conversations held via electronic devices.

Furthermore, the described message response suggestions are relevant to the received image. For example, the described use of previous response and image data, graph-based learning models, and/or grammar based models enable relevant message suggestions to be determined for concepts detected in images, e.g., based on previous occurrences of message responses to particular images, stored taxonomies of concepts, etc. Such relevant suggestions allow a user to simply and quickly respond to received images with reduced user input and reduced time to compose the responses on a device, thus reducing consumption of device resources that would otherwise be needed to enable and process added input from the user to compose responses instead of selecting less relevant suggestions, or to resources that would otherwise be needed to display a large set of possible responses (e.g., including less relevant suggestions). Furthermore, such features promote reduction of consumption of device resources that would otherwise be needed to enable and process added input from the user to compose responses, search, edit, or complete suggested responses, and/or otherwise participate in conversations held via electronic devices.

Consequently, a technical effect of one or more described techniques and features is that creation and transmission of responses in device-implemented conversations is achieved with less computational time and resources expended to obtain results. For example, a technical effect of described features is a reduction in the consumption of system processing resources utilized to create and send message responses than in a system that does not provide one or more of the described features.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

An "image" as referred to herein is a digital image having pixels with one or more pixel values (e.g., color values, brightness values, etc.). An image can be a still image or single image, or can be an image included in a series of images, e.g., a frame in a video sequence of video frames, or an image in a different type of sequence or animation of images. For example, implementations described herein can be used with single images, video sequences of images, or animated images (e.g., cinemagraphs or other animations).

FIG. 1 illustrates a block diagram of an example environment 100 for providing messaging services that enable and, in some embodiments, provide automatic assistive agents, e.g., bots. The exemplary environment 100 includes messaging server 101, one or more client devices 115a, 115n, server 135, concept identifier 120, content classifier 130, and network 140. Users 125a-125n may be associated with respective client devices 115a, 115n. Server 135 may be a third-party server, e.g., controlled by a party different from the party that provides messaging services. In various implementations, server 135 may implement bot services, as described in further detail below. In some implementations, environment 100 may not include one or more servers or devices shown in FIG. 1 or may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, messaging server 101, client devices 115, server 135, concept identifier 120, and content classifier 130 are communicatively coupled via a network 140. In various implementations, network 140 may be a conventional type, wired or wireless, and may have numerous different configurations including a star configuration, token ring configuration or other configurations. Furthermore, network 140 may include a local area network (LAN), a wide area network (WAN) (e.g., the Internet), and/or other interconnected data paths across which multiple devices may communicate. In some implementations, network 140 may be a peer-to-peer network. Network 140 may also be coupled to or include portions of a telecommunications network for sending data in a variety of different communication protocols. In some implementations, network 140 includes Bluetooth® communication networks, Wi-Fi®, or a cellular communications network for sending and receiving data including via short messaging service (SMS), multimedia messaging service (MMS), hypertext transfer protocol (HTTP), direct data connection, email, etc. Although FIG. 1 illustrates one network 140 coupled to client devices 115, messaging server 101, and server 135, in practice one or more networks 140 may be coupled to these entities.

Messaging server 101 may include a processor, a memory, and network communication capabilities. In some implementations, messaging server 101 is a hardware server. In some implementation, messaging server 101 may be implanted in a virtualized environment, e.g., messaging server 101 may be a virtual machine that is executed on a hardware server that may include one or more other virtual machines. Messaging server 101 is communicatively coupled to the network 140 via signal line 102. Signal line 102 may be a wired connection, such as Ethernet, coaxial cable, fiber-optic cable, etc., or a wireless connection, such as Wi-Fi, Bluetooth, or other wireless technology. In some implementations, messaging server 101 sends and receives data to and from one or more of client devices 115a-115n, server 135, concept identifier 120, content classifier 130, and bot 113 via network 140. In some implementations, messaging server 101 may include messaging application 103a that provides client functionality to enable a user (e.g., any of users 125) to exchange messages with other users and/or with a bot. Messaging application 103a may be a server application, a server module of a client-server application, or a distributed application (e.g., with a corresponding client messaging application 103b on one or more client devices 115).

Messaging server 101 may also include database 199 which may store messages exchanged via messaging server 101, data and/or configuration of one or more bots, information provided by content classifier 130, and user data associated with one or more users 125, all upon explicit permission from a respective user to store such data. In some embodiments, messaging server 101 may include one or more assistive agents, e.g., bots 107a and 111. In other embodiments, the assistive agents may be implemented on the client devices 115a-n and not on the messaging server 101.

Messaging application 103a may be code and routines operable by the processor to enable exchange of messages among users 125 and one or more bots 105, 107a, 107b, 109a, 109b, 111, and 113. In some implementations, messaging application 103a may be implemented using hardware including a field-programmable gate array (FPGA) or an application-specific integrated circuit (ASIC). In some implementations, messaging application 103a may be implemented using a combination of hardware and software.

In various implementations, when respective users associated with client devices 115 provide consent for storage of messages, database 199 may store messages exchanged between one or more client devices 115. In some implementations, when respective users associated with client devices 115 provide consent for storage of messages, database 199 may store messages exchanged between one or more client devices 115 and one or more bots implemented on a different device, e.g., another client device, messaging server 101, and server 135, etc. In the implementations where one or more users do not provide consent, messages received and sent by those users are not stored.

In some implementations, messages may be encrypted, e.g., such that only a sender and recipient of a message can view the encrypted messages. In some implementations, messages are stored. In some implementations, database 199 may further store data and/or configuration of one or more bots, e.g., bot 107a, bot 111, etc. In some implementations when a user 125 provides consent for storage of user data (such as social network data, contact information, images, etc.) database 199 may also store user data associated with the respective user 125 that provided such consent.

In some implementations, messaging application 103a/103b may provide a user interface that enables a user 125 to create new bots. In these implementations, messaging application 103a/103b may include functionality that enables user-created bots to be included in conversations between users of messaging application 103a/103b.

Concept identifier 120 may include a processor, a memory and network communication capabilities. In some implementations, concept identifier 120 is a hardware server. Concept identifier 120 is communicatively coupled to the network 140 via signal line 122. Signal line 122 may be a wired connection, such as Ethernet, coaxial cable, fiber-optic cable, etc., or a wireless connection, such as Wi-Fi, Bluetooth, or other wireless technology. In some implementations, concept identifier 120 sends and receives data to and from one or more of the messaging server 101, the client devices 115a-115n, and the content classifier 130 via the network 140. Although concept identifier 120 is illustrated as being one server, multiple concept identifiers 120 can be provided. The content classifier 130 can maintain various databases including an electronic encyclopedia (e.g., dictionary, thesaurus, etc.), a knowledge graph, and one or more other databases (e.g., calendar, map or geography data, etc.).

Concept identifier 120 detects concepts in the content of an image if user consent has been obtained. For example, concept identifier can detect image features in the image. Image features can include people (without determining identity of the people), animals, objects (e.g., articles, vehicles, etc.), particular monuments, landscape features (e.g., foliage, mountains, lakes, sky, clouds, sunrise or sunset, buildings, bridges, etc.), weather, etc. Various image recognition and detection techniques can be used (e.g., machine learning based on training images, comparison to reference features in reference images, etc.) to detect image features.

Based on the detected image features, concept identifier 120 can determine one or more semantic concepts that apply to (e.g., are present in) the content of the image. The concepts can be equivalent to detected image features (e.g., people, objects, landscape features). A single image feature be specified as multiple concepts, e.g., at different levels of generalization or categories, synonyms, etc. For example, a detected animal such as a terrier can be detected as a "terrier" concept, as a "dog" concept, and/or as an "animal" concept. Concepts can also include actions (e.g., walking, running, eating, etc.), emotions or moods (e.g., based on face expressions depicted in the image), geographical location names (e.g., a city or country in which a scene is depicted, or street address), or other topics related to the image content.

In some examples, concept identifier 120 can consult a knowledge base (e.g., knowledge graph) and/or other databases of data that can include a taxonomy of concept terms arranged in a hierarchical graph of nodes, e.g., to indicate relationships between concepts as well as categorization (examples described below). In various implementations, the taxonomy may include entities that are objects (e.g., car, husky, poodle, etc.), landscape features or scenes (e.g., beach, sunset, etc.), actions (e.g., kite surfing, skydiving, running, etc.), emotions (e.g., happiness, laughter, etc.), events (e.g., basketball game, birthday, etc.), abstract concepts (e.g., love), and so on. For example, if a "terrier" is detected in the image, the concept identifier can also determine concepts related to "terrier", e.g., a parent category concept of "dog" that is indicated in the knowledge base. In addition, the image may be associated with metadata including labels that were previously created for the image to describe concepts present in the content of the image, e.g., previously automatically determined labels and/or labels input by one or more users. In addition, some concepts can be determined based on metadata of the image. For example, metadata that is a timestamp indicating the time and date of capture of the image can indicate a particular holiday, birthday, or other calendar event that can be provided as a concept. Metadata that is a geographic location (e.g. geographic coordinates such as latitude and longitude) can indicate place names and other concepts that can be determined, e.g., by consulting geographic reference data (e.g., maps). In some examples, the various determined concepts can be output by concept identifier as text labels that describe the determined concepts.

Concept identifier 120 may be managed by the same party that manages the messaging server 101, or may be managed by a third-party. In some implementations, concept identifier 120 hosts bots. The bots may be computer programs that perform specific functions to provide suggestions. For example, a reservation bot makes reservations, an auto-reply bot generates reply message text, a scheduling bot automatically schedules calendar appointments, etc. Concept identifier 120 may provide or refer one or more bots to the messaging application 103. For example, the code for the bot may be incorporated into the messaging application 103, or the messaging application 103 may send requests to the bot implemented at concept identifier 120. In some implementations, the messaging application 103 acts as an intermediary between the user 125 and concept identifier 120 by providing a bot implemented in concept identifier 120 with bot commands and receiving suggested responses based on the bot commands.

Content classifier 130 may include a processor, a memory and network communication capabilities. In some implementations, content classifier 130 is a hardware server. Content classifier 130 is communicatively coupled to the network 140 via signal line 124. Signal line 124 may be a wired connection, such as Ethernet, coaxial cable, fiber-optic cable, etc., or a wireless connection, such as Wi-Fi, Bluetooth, or other wireless technology.

Content classifier 130 may provide information to the messaging application 103. For example, content classifier 130 may maintain an electronic encyclopedia, a knowledge graph, one or more databases, a social network application (e.g., a social graph, a social network for friends, a social network for business, etc.), a website for a place or location (e.g., a restaurant, a car dealership, etc.), a mapping application (e.g., a website that provides directions), etc. Although content classifier 130 is illustrated as a single server, content classifier 130 may include multiple servers, such as a separate server for a social network application, an electronic encyclopedia, and a mapping application.

In some implementations, content classifier 130 may receive a request for information from the messaging application 103, perform a search, and provide the information in the request. In some examples, content classifier 130 may include classifiers of particular types of content in images. For example, content classifier 130 can receive an image from messaging application 103 and can determine whether any of the detected classes are detected in the content (e.g., pixels) of the image. In some implementations, the content classifier 130 can output information indicating the types of content that have been detected in the image. In some implementations, content classifier can also perform information searches. In some examples, the messaging application 103 may request driving directions or an estimated time of arrival from a mapping application accessed by content classifier.

In some implementations, if a user consents to the use of such data, content classifier 130 may provide the messaging application 103 with profile information or profile images of a user that the messaging application 103 may use to identify a person in an image with a corresponding social network profile. In another example, content classifier 130 may provide the messaging application 103 with information related to entities identified in the messages used by the messaging application 103, if user consent has been obtained for accessing and using provided user data. For example, the concept identifier 120 may include or access an electronic encyclopedia that provides information about landmarks identified in the images, an electronic shopping website that provides information for purchasing entities identified in the messages, an electronic calendar application that provides, subject to user consent, an itinerary from a user identified in a message, a mapping application that provides information about nearby locations where an entity in the message can be visited, a website for a restaurant where a dish mentioned in a message was served, etc. In some implementations, content classifier 130 may communicate with the concept identifier 120 to obtain information. Content classifier 130 may provide the requested information to the concept identifier 120.

In some implementations, the concept identifier 120 and/or content classifier 130 may receive information from the messaging application 103, e.g., to update databases used or maintained by these modules. For example, where the content classifier 130 maintains a website about a restaurant, the messaging application 103 may provide the content classifier 130 with updated information about the restaurant, such as a user's favorite dish at the restaurant.

Client device 115 may be a computing device that includes a memory and a hardware processor, for example, a camera, a laptop computer, a tablet computer, a mobile telephone, a wearable device, a mobile email device, a portable game player, a portable music player, a reader device, head mounted display or other electronic device capable of wirelessly accessing network 140.

In the illustrated implementation, client device 115*a* is coupled to the network 140 via signal line 108 and client device 115*n* is coupled to the network 140 via signal line 110. Signal lines 108 and 110 may be wired connections, e.g., Ethernet, or wireless connections, such as Wi-Fi, Bluetooth, or other wireless technology. Client devices 115*a*, 115*n* (e.g., "user devices") are accessed by users 125*a*, 125*n*, respectively. The client devices 115*a*, 115*n* in FIG. 1 are used by way of example. While FIG. 1 illustrates two client devices, 115*a* and 115*n*, the disclosure applies to a system architecture having one or more client devices 115.

In some implementations, client device 115 may be a wearable device worn by a user 125. For example, client device 115 may be included as part of a clip (e.g., a wristband), part of jewelry, or part of a pair of glasses. In another example, client device 115 can be a smartwatch. In various implementations, user 125 may view messages from the messaging application 103*a*/103*b* on a display of the device, may access the messages via a speaker or other output device of the device, etc. For example, user 125 may view the messages on a display of a smartwatch or a smart wristband. In another example, user 125 may access the messages via headphones (not shown) coupled to or part of client device 115, a speaker of client device 115, a haptic feedback element of client device 115, etc.

In some implementations, messaging application 103*b* is stored on a client device 115*a*. In some implementations, messaging application 103*b* (e.g., a thin-client application, a client module, etc.) may be a client application stored on client device 115*a* with a corresponding a messaging application 103*a* (e.g., a server application, a server module, etc.) that is stored on messaging server 101. For example, messaging application 103*b* may transmit messages created by user 125*a* on client device 115*a* to messaging application 103*a* stored on messaging server 101.

In some implementations, messaging application 103*a* may be a standalone application stored on messaging server 101. A user 125*a* may access the messaging application 103*a* via a web page using a browser or other software on client device 115*a*. In some implementations, messaging application 103*b* that is implemented on the client device 115*a* may include the same or similar modules as that are included on messaging server 101. In some implementations, messaging application 103*b* may be implemented as a standalone client application, e.g., in a peer-to-peer or other configuration where one or more client devices 115 include functionality to enable exchange of messages with other client devices 115. In these implementations, messaging server 101 may include limited or no messaging functionality (e.g., client authentication, backup, etc.). In some implementations, messaging server 101 may implement one or more bots, e.g., bot 107*a* and bot 111.

Server 135 may include a processor, a memory and network communication capabilities. In some implementations, server 135 is a hardware server. Server 135 is communicatively coupled to the network 140 via signal line 128. Signal line 128 may be a wired connection, such as Ethernet, coaxial cable, fiber-optic cable, etc., or a wireless connection, such as Wi-Fi, Bluetooth, or other wireless technology. In some implementations, server 135 sends and receives data to and from one or more of messaging server 101 and client devices 115 via network 140. Although server 135 is illustrated as being one server, various implementations may include one or more servers 135. Server 135 may implement one or more bots as server applications or server modules, e.g., bot 109*a* and bot 113.

In various implementations, server 135 may be part of the same entity that manages messaging server 101, e.g., a provider of messaging services. In some implementations, server 135 may be a third party server, e.g., controlled by an entity different than the entity that provides messaging application 103*a*/103*b*.

In some implementations, one or more components of the environment 100 provides or hosts bots. A bot is an automated service, implemented on one or more computers, that users interact with via user input, e.g., text, such as via messaging application 103*a*/103*b* or other applications, etc. Bots are described in greater detail below.

In some implementations, messaging application 103*a*/103*b* may also provide one or more suggestions, e.g., suggested responses, to users 125 via a user interface. In some implementations, suggested responses can be provided in response to user input, e.g., via a button or other user interface element. Suggested responses may enable faster interaction, e.g., by reducing or eliminating the need for a user to type a response. Suggested responses may enable users to respond to a message quickly and easily, e.g., when a client device lacks text input functionality (e.g., a smartwatch that does not include a keyboard or microphone). Suggested responses may also enable users to respond quickly to messages, e.g., when the user selects suggested response (e.g., by selecting a corresponding a user interface element on a touchscreen). Suggested responses may be generated using predictive models, e.g., machine learning models, that are trained to generate responses.

For example, messaging application 103*a*/103*b* may implement machine learning, e.g., a deep learning model, that can enhance user interaction with messaging application 103. In some implementations, machine learning can be implemented on one or more components of the environment 100. Machine-learning models may be trained using synthetic data, e.g., data that is automatically generated by a computer, with no use of user information. In some implementations, machine-learning models may be trained, e.g., based on sample data, for which permissions to utilize user data for training have been obtained expressly from users. For example, sample data may include received messages and responses that were sent to the received messages. Based on the sample data, the machine-learning model can predict responses to received messages, which may then be provided as suggested responses. User interaction is enhanced, e.g., by reducing burden on the user to compose a response to a received message, by providing a choice of responses that are customized based on the received message and the user's context. For example, when users provide consent, suggested responses may be customized based on the user's prior activity, e.g., earlier messages in a conversation, messages in different conversations, etc. For example, such activity may be used to determine an appropriate suggested response for the user, e.g., a playful response, a formal response, etc. based on the user's interaction style. In another example, when the user specifies one or more preferred languages and/or locales, messaging application 103a/103b may generate suggested responses in the user's preferred language. In various examples, suggested responses may be text responses, images, multimedia, etc.

In some implementations, machine learning may be implemented on messaging server 101, on client devices 115, or on both messaging server 101 and client devices 115. In some implementations, a simple machine learning model may be implemented on client device 115 (e.g., to permit operation of the model within memory, storage, and processing constraints of client devices) and a complex machine learning model may be implemented on messaging server 101. If a user does not provide consent for use of machine learning techniques, such techniques are not implemented. In some implementations, a user may selectively provide consent for machine learning to be implemented only on a client device 115. In these implementations, machine learning may be implemented on client device 115, such that updates to a machine learning model or user information used by the machine learning model are stored or used locally, and are not shared to other devices such as messaging server 101, server 135, or other client devices 115. Some further examples of machine learning implementations are described below.

For the users that provide consent to receiving suggestions, e.g., based on machine-learning techniques, suggestions may be provided by messaging application 103. For example, suggestions may include suggestions of content (e.g., movies, books, etc.), schedules (e.g., available time on a user's calendar), events/venues (e.g., restaurants, concerts, etc.), and so on. In some implementations, if users participating in a conversation provide consent to use of conversation data, suggestions may include suggested responses to incoming messages that are based on conversation content. For example, if a first user of two users that have consented to suggestions based on conversation content, sends a message "do you want to grab a bite? How about Italian?" a response may be suggested to the second user, e.g. "@assistant lunch, italian, table for 2." In this example, the suggested response includes a bot (identified by the symbol @ and bot handle assistant). If the second user selects this response, the assistant bot is added to the conversation and the message is sent to the bot. A response from the bot may then be displayed in the conversation, and either of the two users may send further messages to the bot. In this example, the assistant bot is not provided access to the content of the conversation, and suggested responses are generated by the messaging application 103.

In certain implementations, the content of a suggested response may be customized based on whether a bot is already present in a conversation or is able to be incorporated into the conversation. For example, if it is determined that a travel bot could be incorporated into the messaging app, a suggested response to a question about the cost of plane tickets to France could be "Let's ask travel bot!"

In different implementations, suggestions, e.g., suggested responses, may include one or more of: text (e.g., "Terrific!"), emoji (e.g., a smiley face, a sleepy face, etc.), images (e.g., photos from a user's photo library), text generated based on templates with user data inserted in a field of the template (e.g., "her number is <Phone Number>" where the field "Phone Number" is filled in based on user data, if the user provides access to user data), links (e.g., Uniform Resource Locators), message stickers, etc. In some implementations, suggested responses may be formatted and/or styled, e.g., using colors, fonts, layout, etc. For example, a suggested response that includes a movie recommendation may include descriptive text about the movie, an image from the movie, and a link to buy tickets. In different implementations, suggested responses may be presented as different types of user interface elements, e.g., text boxes, information cards, etc.

In different implementations, users are offered control over whether they receive suggestions (e.g., suggested responses), what types of suggestions they receive, a frequency of the suggestions, etc. For example, users may decline to receive suggestions altogether, or may choose specific types of suggestions, or to receive suggestions only during certain times of day. In another example, users may choose to receive personalized suggestions. In this example, machine learning may be used to provide suggestions, based on the user's preferences relating to use of their data and use of machine learning techniques.

Figure 2:
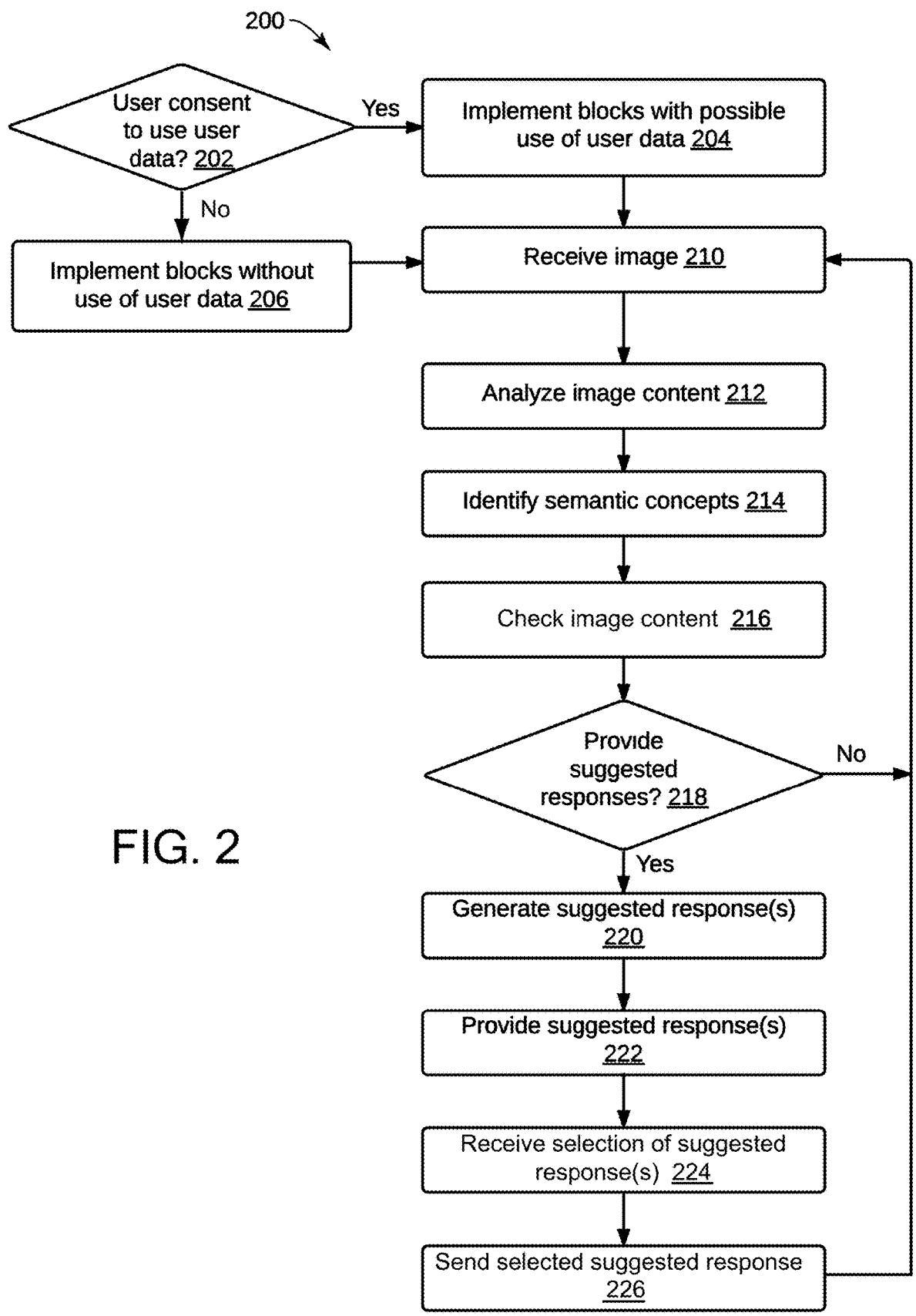
FIG. 2 is a flow diagram illustrating an example method to provide suggested responses to a message, according to some implementations.

FIG. 2 is a flow diagram illustrating an example method 200 to provide suggested responses to a message, according to some implementations. In some implementations, method 200 can be implemented, for example, on a server system, e.g., messaging server 101 as shown in FIG. 1. In some implementations, some or all of the method 200 can be implemented on a system such as one or more client devices 115 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 200.

In block 202, it is checked whether user consent (e.g., user permission) has been obtained to use user data in the implementation of method 200. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 210.

If user consent has not been obtained, it is determined in block 206 that blocks are to be implemented without use of user data, and the method continues to block 210. In some implementations, if user consent has not been obtained, blocks are to be implemented without use of user data and with generic or publicly-accessible data.

Implementations described herein may provide message suggestions based on an image. Message suggestions may be provided in a variety of contexts. For example, message suggestions may be provided in response to receiving an image on a client device 115a of a particular user (e.g., user 125a) from any of client devices 115, e.g., by a messaging application 103. For example, messaging application 103 may be an instant messaging application, a social network application, an email application, a multimedia messaging application, and the like. Message suggestions may be generated and provided to the particular user automatically, upon consent from the particular user and one or more other users that sent and/or received the image. For example, if the messaging application is an instant messaging application, an image may be received as part of an instant messaging communication between the particular user 125a and one or more other users 125, e.g., in a messaging session (e.g., chat) having two participants, in a group messaging session that includes more than two participants, etc. In various implementations, one or more of the users may be bots. In some implementations, bots may be automated agents that are implemented in software and/or hardware. In some implementations, bots may represent or be associated with cameras (e.g., security cameras, web cameras, surveillance cameras, etc.), appliances (e.g., a smart refrigerator, an alarm device, an industrial appliance, etc.), imaging devices (e.g., microscopes, medical imaging devices, etc.) and send one or more images via messaging application 103. In the implementations that include one or more of the users that are bots, consent is obtained from an owner or operator of the bot to use messages generated by the bot. In some implementations, consent may be specified as a configuration parameter of the bot, camera, appliance, etc. and be provided to the messaging application 103 upon the bot interacting with the messaging application 103.

In some implementations, message suggestions may be provided specifically to those users that have provided consent to access user data. In some implementations, message suggestions may be provided automatically or based on user input, e.g., a user may be provided a user interface that receives user input that requests message suggestions.

In block 210, one or more images are obtained, generally referred to as an image herein. In various implementations, the image may be a static image (e.g., a photograph, an emoji, or other image), a cinemagraph or animated image (e.g., an image that includes motion, a sticker that includes animation and audio, etc.), a video, etc. In some examples, the image may have been sent by one or more client devices 115, or by a bot that sends messages, and the image may be received by a client device 115 via network 140. In a one-on-one (1:1) messaging session with two participants, the image may be received by one of the participants, e.g., by a client device of a particular user. In a group messaging session, the image may be received by two or more client devices of participants in the group messaging session. In some implementations, the image may be obtained from storage, e.g., local storage of a client device 115 (e.g., memory, storage drive, etc.) and/or remote storage accessible to a client device over network 140 (e.g., storage drives of a remote client device, server device, or storage device). In some implementations, the image can be posted within the messaging application, e.g., based on being included in a message that is transmitted by a device of a user. For example, the messaging server may post the image within the messaging application 103a. In another example, a client device 115 may post the image within the messaging application 103b.

In some implementations, the image can be accompanied by, received with, or otherwise associated with other types of received data, e.g., text. For example, the obtained image can be an attachment to, preceded by, or followed by a message that includes text data, e.g., a text (e.g., SMS) message or an email message. In another example, the obtained image can be received as a message in an ongoing chat conversation that involves the receiving device and one or more other devices including the sending device that sent the obtained image. For example, in the chat conversation, one or more text messages may have been received by the receiving device from the sending device (and/or other devices participating in the chat conversation) before receiving the obtained image, and/or one or more text messages may have been received by the receiving device before receiving the obtained image. In some implementations, the obtained image can be included in or associated with a received message or chat conversation, where the message or chat conversation includes message content separate from and associated with the image. For example, such message content can include text content that may be related to the image, e.g., describe or indicate features depicted in the image ("look at this dog!"), direct attention to the image or one or more features depicted in the image ("Check this out!"), etc. The method may continue to block 212.

In block 212, pixels and/or metadata of the image received in block 210 are analyzed. For example, the image may be analyzed by content classifier 130. In some implementations, the image may be analyzed using one or more image recognition techniques and/or image detected techniques. In some implementations, one or more objects or other image features in the image may be detected, e.g., using one or more object recognition techniques. For example, image features including faces (without identity), animals, objects, landscape features (foliage, buildings, sky, sunsets, etc.) can be detected. In some implementations, one or more types of content can be determined, e.g., based on one or more detected image features. For example, particular image features may be categorized into particular types based on predefined associations and relationships. The method may continue to block 214.

In block 214, one or more semantic concepts (e.g., dog, goat, sunset, beach, temple, etc.) that are associated with the image may be identified, e.g., based on the analysis in block 212. In some implementations, the semantic concepts may be part of a graph structure. In some implementations, the semantic concepts may be organized in a taxonomy. In some implementations, the taxonomy may define relationships between concepts, e.g., a hierarchical relationship, an equivalence relationship, etc. For example, the graph structure can implement a knowledge base of various entities (subjects, topics, actions, categories, etc.), with links and relationships defined between the entities. For example, a particular subject entity ("terrier") can have relationships to higher-level (parent) entities ("dog") which include that subject entity or are more general descriptions of that subject entity. A particular entity can have relationships to actions or other entities related to the subject and/or category of the particular entity (e.g., "fetch," "guard," "walk," etc. as action entities related to a "terrier" or "dog" subject entity). The graph structure can be defined and stored as data on one or more accessible storage devices. The method may continue to block 216.

In block 216, the image is checked for particular types or classifications of content for which message suggestions are not to be provided. For example, the image and/or its metadata can be sent to content classifier 130, which can determine whether the image content is included in particular predefined classifications for which message suggestions are not to be provided. The method may continue to block 218.

In block 218, it is determined whether message suggestions (e.g., suggested responses) are to be provided for the image. For example, based on the image analysis of block 212, the semantic concepts of block 214, and/or the check for particular types content of block 216, it can be determined whether the image includes one or more particular types or classifications of content for which message suggestions are not to be provided by the method 200. The particular types or classifications of content may include concepts that are set as "Do not generate message suggestions" concepts in order to suppress generation and presentation of message suggestions.

If the image includes one or more particular types of content for which message suggestions are not provided, the method refrains from providing message suggestions, e.g., returns to block 210 to obtain another image to process. Otherwise, the method may continue to block 220.

In block 220, one or more message suggestions are generated, e.g., programmatically generated by a system. For example, the one or more message suggestions can be message responses, e.g., messages that are responses to the image obtained in block 210. In some implementations, the message suggestions may be generated based upon the semantic concepts identified for the obtained image. In some implementations, one or more mapping models may be used to generate message suggestions. For example, the mapping models may include a graph learning-based model, a grammar-based model, and/or other suitable models. In some implementations, one or more message suggestions can be generated based on invoking or requesting information from one or more bots accessible to the device. The responses generated by the one or more mapping models and/or bots may be combined and ranked to identify one or more top message suggestions. The message suggestions can be or include text or textual content (e.g., phrases, words, emoji, other types of characters or character strings, etc.), images, videos, and/or other types of media content.

In some examples, a concept identified from the obtained image can be included as text in one or more message suggestions. In some further examples, a first concept identified from the obtained image can be associated with one or more other concepts, e.g., as indicated in an accessible database, hierarchical taxonomy of concepts, or knowledge base graph, or via a graph or mapping model as described herein, and the other concepts can be included as text in one or more message suggestions. In some examples, a mapping model can determine textual content that is associated with a concept (e.g., the first concept and/or one or more of the other concepts), and that textual content can be included as text in one or more message suggestions.

In some example implementations, message suggestions can be generated in text form as described in some examples detailed herein, and this generated text can be matched to concepts (e.g., labels) that have been detected in other (e.g., non-text) types of media content accessible to the user device, such as images from a user's collection or from an accessible image library or photo library. These concepts may have been identified in the other types of media content similarly as described herein. Such matched media content can then be provided as message suggestions as described herein. For example, a matched image can be determined as a message suggestion.

In some implementations, the message suggestions can include one or more images, e.g., one or more images programmatically retrieved from storage associated with the particular user of a client device that received the obtained image over a network from a different device. For example, the storage can be provided by one or more storage devices of the receiving client device (e.g., local storage) or one or more storage devices in communication with the receiving client device over a communication network such as network 140 (e.g., remote storage). In some implementations, one or more images used for one or more message suggestions can have one or more semantic concepts that match one or more concepts identified in the obtained image. In some implementations, these suggestion images can be images that have one or more semantic concepts that are associated with one or more concepts in the obtained image, e.g., related to the concepts in the obtained image based on connections in a taxonomy or graph of concepts, etc.

In some implementations, one or more message suggestion images can be organized in one or more groups of images that are each associated with one or more identified semantic concepts. For example, a group of images may be stored in association with one or more particular semantic concepts. If one of those particular semantic concepts is determined in the obtained image, the images in the associated group of images can each be determined as a suggested response to the obtained image (or each included in a suggested response that includes other types of media content, e.g., text, audio, etc.).

In some implementations, the one or more images used for one or more message suggestions can be obtained based at least in part on their association with one or more particular users, e.g., a user that provided or is associated with the images obtained in block 210, users having a social connection or particular social relationship to a particular user of the particular device providing the message suggestions, etc. For example, the social connection or relationship can be determined, if user consent has been obtained, based on data from an accessible database, e.g., a contact list on a device, a user group associated with the particular user in a social networking service, etc. In some examples, if user consent has been obtained by involved users, if a user A sends an image I obtained in block 210, then other images that are associated with one or more semantic concepts in image I and that are associated with user A (e.g., images that depict user A, were previously sent from or sent to user A, etc.) can be selected as message suggestions in response to obtaining image I.

In some implementations, multiple images are obtained in block 210 and one or more of the message suggestions are generated in block 220 based on a combination of the multiple images, e.g., based on a combination of multiple determined semantic concepts identified for the multiple images. In an example, a semantic concept of "dog" in a first obtained image and a semantic concept of a "park" in a second obtained image can be combined to generate message suggestions that include a phrase such as "your dog must be having fun at the park!" and a suggested image response that is an image of the user that depicts a dog at a park.

In some implementations, one or more of the message suggestions are generated further based on other content data of a message that may have been received in block 210, for example. In some examples, one or more received messages that includes or are associated with the obtained image(s) may include text content, audio content, or other content in addition to the image, and one or more of the message suggestions can be generated further based on this other content data. For example, the other content data can be used in combination with the image as described above, to generate one or more message suggestions. In some examples, semantic concepts can be determined based on the other content data and combined with one or more semantic concepts determined for the image, where one or more message suggestions are determined based on the combined semantic concepts. For example, a semantic concept of "dog" determined from an image depicting a dog can be combined with a semantic concept of "friend" obtained from a received text message accompanying or associated with the image, where the received text message states, "look what my friend got." This can allow the system to generate one or more message suggestions that are associated with "friend," "dog," and "friend+dog." For example, a generated message suggestion can describe (e.g., in a text suggestion) or depict (e.g., in an image suggestion) one or more dogs associated with other users that have a particular or threshold social connection that is close to the user of the receiving device (where social connection can be determined, if user consent has been obtained, similarly as described herein). The method may continue to block 222.

In block 222, one or more of the top-ranked message suggestions are provided to the user. For example, the top-ranked message suggestions can be displayed on a display device of a client device 115 used by the user, and/or output in other ways (e.g., as audio output, with a generated voice or other audio). In some examples, if the image was obtained in a message, the image can be displayed in a messaging interface and the top-ranked message suggestions can be displayed as message responses to the image and in association with the image, e.g., on one side of the image or otherwise visually associated with the image. In various implementations, a particular number of the top-ranked message suggestions can be displayed, e.g., three, ten, etc. Additional message suggestions can also be displayed, e.g., in response to user input received by the displaying device. In some implementations, the number of presented message suggestions can be determined by the user, e.g., via user input and/or stored user preferences. The method may continue to block 224.

In block 224, a selection of one or more of the displayed top-ranked message suggestions is received. For example, the selection can be based on user input provided by the user at a user device, e.g., via an input device such as a touchscreen or trackpad receiving a user touch, a microphone receiving a voice command, a button, mouse, or joystick receiving user manipulation, etc. In some examples, the user can input a single tap on a touchscreen to select an associated suggestion, thus reducing the amount of user input compared to manually entering text of a message response or manually browsing and selecting other data for a message response. In some implementations, one or more of the message suggestions can be selected automatically (without user input), e.g., based on user preferences, user context (e.g., geographic location, time or date, etc., if user consent has been obtained), or other predefined conditions being met. The method may continue to block 226.

In block 226, the selected message suggestion(s) are output as one or more messages to one or more other devices. For example, a message can be transmitted over the network 140 to one or more other client devices 115 via messaging server 101 and/or directly to the other client devices 115. In some implementations, e.g., in a messaging conversation, the message can be posted within the messaging application executing and displayed by the device that provided the message suggestions, and the message can also be transmitted to the client device that sent the image obtained in block 210 and/or to any other client devices participating in the messaging conversation. For example, the transmitted message can be displayed in messaging applications executing on those other devices. The method can then return to block 210 in some implementations, e.g., if another image has been obtained.

Figure 3:
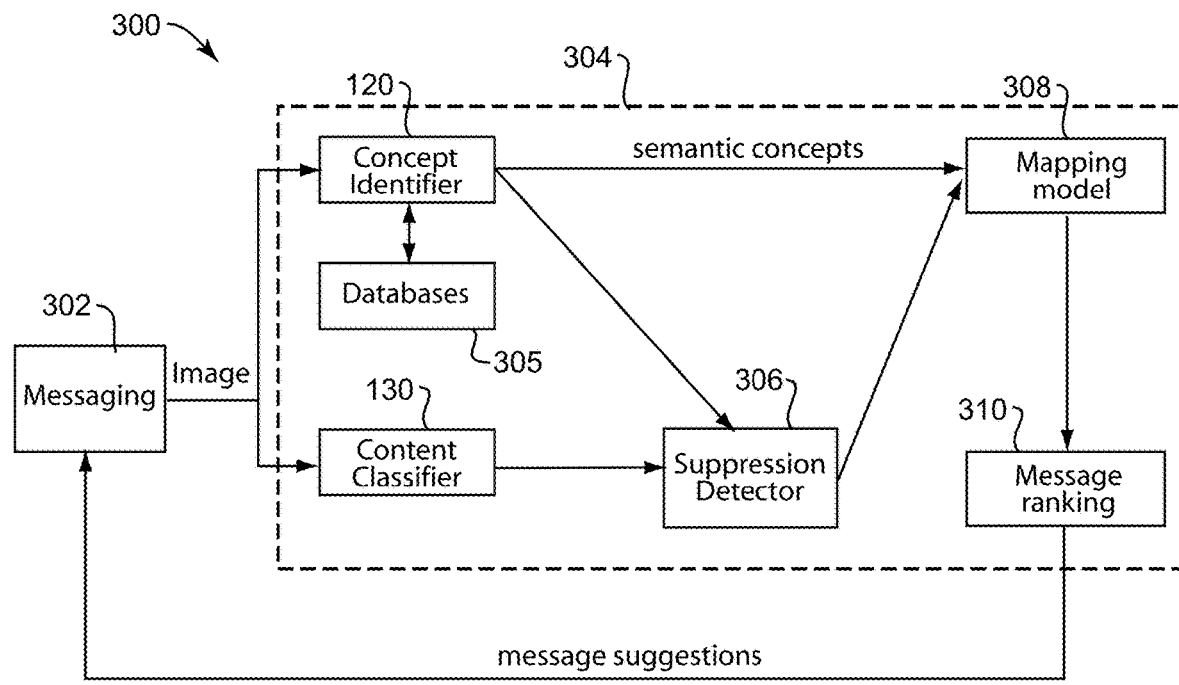
FIG. 3 is a block diagram illustrating an example module that can implement one or more features, according to some implementations.

FIG. 3 is a block diagram illustrating one example module 300 that can implement one or more features described herein. In some implementations, a messaging module 302 can be a component of a messaging application 103, and may obtain an image as described above for FIG. 2, e.g., as part of a received message from a different user device. The image can be sent to a message suggestion module 304, which can include several different components. Some or all of the components of the message suggestion module 304 can be implemented in messaging application 103 and/or in other modules or components of the system.

For example, the image pixels can be sent from messaging module 302 to the concept identifier 120 and to the content classifier 130, which are described above with reference to FIG. 1. As described above, the concept identifier 120 determines semantic concepts present in or otherwise related to the image based on the image content and/or metadata associated with the image, and by consulting data in databases 305, e.g., a taxonomy of concepts stored in a knowledge base hierarchical graph in databases 305. In some implementations, the concept identifier outputs determined concepts as labels. These concepts can be output to a suppression detector 306 and to a mapping model 308. The content classifier 130 can determine classification information about the image, including indications of particular classifications or types of content depicted in the image. For example, classifications can be determined and output by the content classifier 130 to the suppression detector 306.

In some implementations, particular content classifications or types can be determined by a specialized classifier oriented to detecting those types of content based on image pixels of the image. For example, the content classifier 130 can detect particular classifications of content based on examining pixels for particular objects, facial expressions, and/or other image features.

Suppression detector 306 can be implemented in the messaging application 103 in some implementations. Suppression detector 306 can receive data from content classifier 130, e.g., indicating particular classifications of content that are present in the image. Based on the obtained classifications, the suppression detector 306 can determine whether the image includes particular types or classifications of content and thus whether message suggestions should be provided as responses to the image or be suppressed.

Mapping model component 308 can be implemented in the messaging application 103 in some implementations. Mapping model component 308 receives the semantic concepts (e.g., labels provided as label data) from the concept identifier 120, and also receives data indicating whether particular types or classifications of content are present in the image from suppression detector 306 (and/or receives the indicated types or classifications). Mapping model component 308 generates message suggestions (e.g., suggested responses) for the image based on the received data. In some implementations, the mapping model component 308 uses one or more models to generate the message suggestions, e.g., a graph-based learning model, a grammar-based model, etc., some examples of which are described below. In some implementations, one or more message suggestions can be generated based on invoking or requesting information from one or more bots accessible to the device. For example, the mapping model component 308 (or other component of the system) can determine that an appropriate message suggestion is particular information relevant to the content or metadata of the image (e.g., a location, time, activity, calendar event, associated user, etc.). The component 308 can determine that a particular accessible bot can obtain that information, and a command and/or request to the bot can be generated as a message suggestion. For example, the command and/or request to the bot can be displayed as a suggestion or option which a user can select to cause the command to be sent to the bot. The bot can output the particular information in response to the command.

A message ranking component 310 receives the message suggestions generated by the mapping model component 308 and combines and ranks the message suggestions. For example, the message suggestions can be ranked based on calculated scores, where a score can be determined for each message suggestion determined for the image. For example, a calculated score for a message suggestion can be based on a determined probability that the suggestion is relevant to the image, where the probability can be based on frequency of occurrence in historical message data and/or associations of the suggestion to one or more related concepts of the image in historical message data. Historical message data may be data from prior conversations where participants in the conversation have provided consent for use of such data to implement message suggestion features. Historical message data is not used if users have not provided permission for such use. In some implementations, message suggestions are ranked based on a ranking of the detected concepts used to determine the message suggestions. For example, the concepts can be ranked based on a confidence level or score provided by the concept identifier 120 for each concept, where the confidence level indicates the confidence of the concept identifier as to the accuracy of the detected concept being depicted or associated with the image. Suggested responses can be output in the ranked order. In some implementations, message suggestions that request information from bots can be similarly ranked based on one or more confidence scores determined based on similar factors (e.g., confidence of concept detection, frequency in training message data, etc.), and/or in some implementations at least one bot-related message can be ranked highly (e.g., as an alternative suggestion for the user). In some implementations, the system can also rank message suggestions based on diversity. For example, if multiple highest ranking message suggestions are similar to each other (e.g., have a threshold percentage of the same letters, such as "haha" and "hahaha", or have the same semantic meaning), then the ranking can be adjusted to increase diversity of message suggestions, e.g., by lowering the rank of at least one of the similar suggestions.

A particular number of the top-ranked message suggestions can be sent by the message ranking component 310 to the messaging module 302 to be displayed or otherwise output on the user device. One or more of these message suggestions can be selected by user input to send one or more messages to other devices, where the one or more messages include the content of the selected suggestion(s). In some implementations, if a selected message suggestion is a command or request to a bot, the bot can be added to the message conversation and obtains and displays requested information in the conversation interface, and the users can send further messages to the bot.

Multimodal Graph-Based Learning Model

The mapping model component 308 of the message suggestion module 304 of FIG. 3 can be used to generate message suggestions. In some implementations, the message suggestions can be determined using one or more models implemented in storage and by one or more processors of a system. In some examples, a multimodal graph-based learning model and/or a grammar-based model can be used.

A multimodal graph-based learning model can include a learning model based on training data. The learning model can be created in a training stage based on the training data, prior to receiving the image for which message suggestions are to be generated. Upon receiving the image, e.g., in an inference stage after the learning model has been trained, the message suggestions can be generated using the learning model. In some implementations, part or all of the learning model can be created upon receiving the image for which the message suggestions are to be generated.

In some examples, the training data may be message data that includes images and responses to those images. For example, the message data can be synthetic data, e.g., based on simulated conversations where no human users are participants. In additional examples, training data may include images and messages exchanged by users who agree to provide such data for training purposes. Training data is treated before use to remove user identifiers and other information.

Figure 4:
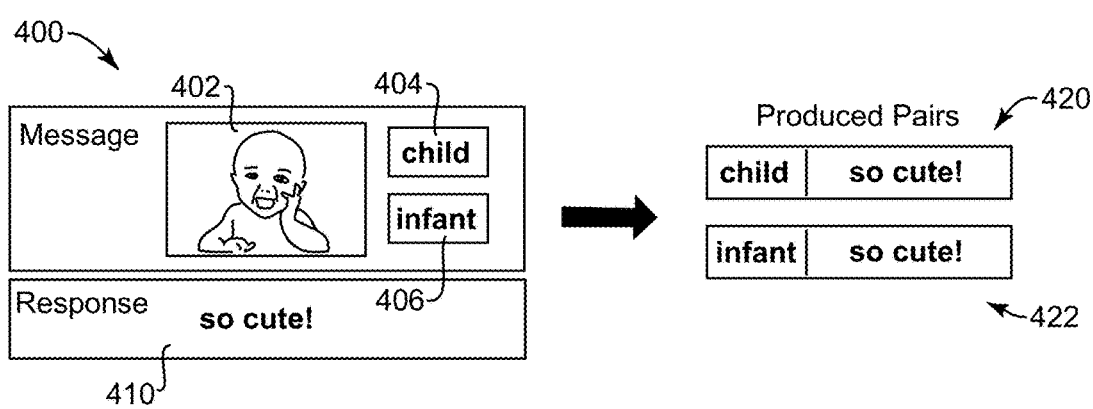
FIG. 4 is a block diagram illustrating an example of a message stream in a set of message data, according to some implementations.

FIG. 4 shows one example of a message stream 400 in the set of message data. Message stream 400 includes an image 402 that was sent from one user to another as a message, e.g., via the network 140. Image features (labels) are detected in the image 402 and include the "child" label 404 and the "infant" label 406. A response 410 is also included in the message stream, where the response 410 is a text message that was sent from the user who received the image 402 to the user who sent the image 402. From this message stream 400, two label-response pairs 420 and 422 are determined, from the pairing of each label 404 and 406 with the response 410.

In some implementations, based on the training message data, the system can determine frequent historical responses from users in response to receiving images from different users, where the images depict particular detected image features described by semantic concepts (e.g., descriptive labels), and these most frequent responses and semantic concepts can be organized and stored by the system. Upon receiving a new image, the concepts detected in the new image can be compared to stored concepts of the model, and matched stored concepts can provide associated responses to use as message suggestions.

In some implementations, some of the most frequent responses in training message data may not be as suitable for message suggestions as other, less frequent responses in the training message data. For example, the most frequent responses may be dominated by responses that may not be specific to the image features (e.g., specific to concepts or labels derived from image features) detected by the system. In some examples, a generic response such as "lol" may be the most frequent response to many different images and concepts, which is a generic response that is not specific to any particular image feature or concept.

Some implementations can filter out such frequent generic responses to obtain more content-specific or more concept-specific responses, e.g., responses more specific to particular content or particular concepts. For example, statistical association scores can be computed between labels and responses, where a statistical association score indicates the degree that a particular label is associated with a particular response in particular training data. In some examples, pointwise mutual information (PMI) can be determined for each label-response pair, in which the probability of occurrence of the label-response pair (label, response) and the individual probabilities of the label and response in the pair can be used to determine the PMI as below:

$$PMI(\text{label, response}) = \log \frac{P(\text{label, response})}{P(\text{label})P(\text{response})}$$

For example, pairs having an association score (e.g., PMI) below a particular association threshold (e.g., PMI threshold) can be removed from use as training data (e.g., filtered from the training data) and/or removed from use in generating message suggestions. In some examples, an association threshold of 1 can be used. The pairs remaining after the filtering are more frequently occurring than the removed (filtered) pairs when the label and response independently occur in the message data, and the responses of these remaining pairs are more specific to the content described by the associated labels in these remaining pairs (e.g., the pairs remaining have labels and responses more associated with each other, while the pairs filtered out have labels and responses less associated with each other). The remaining pairs can be used to generate message suggestions for new images that are detected to have concepts provided in the remaining pairs.

In some implementations, some concepts and related responses in the training message data may be sparse. In an example, after PMI filtering a set of images and responses, the only concept-specific response for label "tourism" may be "fun." However, it may be known from other data analysis that "fun" and "have fun" are related responses (e.g., these responses have a common word, "fun"). Then, "have fun" can also be assigned or designated to be related to "tourism," e.g., "have fun" can be another possible suggested response to the label "tourism." In another example, it may be known from training message data that images labelled with "tourism" tend to be labelled with "vacation" as well (e.g., over a threshold number or percentage of images in training data have both these labels), and that "jealous" is a concept-specific response for "vacation." Then, "jealous" can be related as a concept-specific response to the label "tourism" as well.

In some implementations, these relationships can be formalized using graph-based learning. For example, a graph is built, where nodes consist of labels, images, and responses known from training data. The graph can be used to determine suggested responses to newly-received images. In some examples, the graph can include the following edges:

An edge is provided between image i and response r, if response r has occurred for image i in the set of message data. The weight of the edge is set to a hyperparameter contrib_observed that sets the relative importance of occurred responses with respect to responses obtained through propagation in the graph. For example, a response that occurred in response to a particular image in the training data can be assigned a higher weight than responses indirectly connected to particular image An edge is provided between image i and label L if response r has occurred for image i and the pair (L, r) is above the association threshold. The weight corresponds to a confidence score (indicating a confidence that the label correctly describes content depicted in the image) for the label normalized across all labels for the image in such a way that the sum of weights for all labels sums up to 1−contrib_observed.

An edge is provided between (connecting) images i and i' if i and i' are visually similar. For example, similarity can be determined using one or more image comparison techniques that compare corresponding pixel values of two images and determine a difference measure, where the compared images can be considered similar if an overall difference measure for the pixels values of the images satisfies a similarity threshold. In some implementations, a similarity measure can be determined for two images based on one or more same or similar labels being detected in or otherwise associated with the two images. In some implementations, an edge can be provided between a label l of image i and a label l' of image i', e.g., if the images i and i' have been determined to be visually similar.

An edge is provided between (connecting) responses r and r' if these responses are related through correlations in the set of message data, e.g., correlations between the responses. For example, if these responses are similar, e.g., include the same or similar words (e.g., both responses include the word "fun" or include the same emoji), if both responses often occur in the message data in response to an image having a particular concept (label) (e.g., over a threshold frequency of occurrence), if both responses often occur in a particular communication between users (e.g., over a threshold frequency of occurrence), or if the responses have some other correlation, they can be considered related and an edge is connected between them.

The edges of the graph can be used to relate images, labels, and responses as described above, and such edges can be followed to determine a strength of connection between a response and an image. For example, as indicated above, for some concepts (e.g., labels) identified from images, there may be sparse data in the set of (e.g., filtered) training message data, e.g., few occurrences of labels and thus few occurrences of responses for those labels. To reduce the effects of such sparsity (e.g., lack of responses available to be selected for particular concepts), responses for other labels and images can be propagated through the graph. For example, seed labels can be associated to response nodes in the graph. The seed labels are identity labels, and allow the influence of the response nodes to be propagated throughout the graph. For example, graph-based propagation can be performed, which solves an optimization problem to reduce or minimize the difference in labels between nodes and their neighbors. As a result, each node corresponding to a label obtains a distribution over responses in the graph, where the distribution for a label indicates the strength of correlation (e.g., frequency of occurrence) of each of the responses for that label. The distribution of responses can be stored in association with a label node. In some implementations, the fewer edges provided that are connected between a label node and a response node, the stronger the connection between the corresponding label and response, and the distribution can indicate these strengths for various labels in the graph.

Figure 5A:
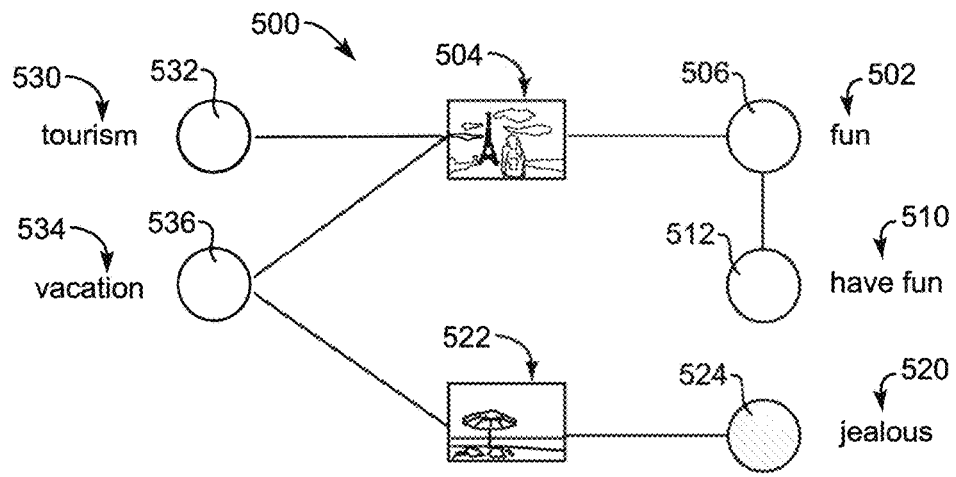
FIGS. 5A, 5B, and 5C are diagrammatic illustrations of example graphs including images, labels, and responses, according to some implementations.

FIG. 5A shows one example of a graph 500 including images, labels, and responses as described above. In the set of examined training message data, response 502 has occurred for an image at image node 504 and so response node 506 for response 502 is connected to image node 504 in the graph. Response 510 did not occur in the set of examined data, and so response node 512 for the response 510 is not connected to an image node. However, response 510 is considered related to response 502, e.g., due to both responses including the word "fun." Response 520 has occurred for an image at image node 522 and so response node 524 for response 520 is connected to image node 522 in the graph.

Furthermore, the label 530 ("tourism") of label node 532 has been determined for the image of image node 504 based on image detection techniques as described above (e.g., based on detection of the monument in the image, etc.), so an edge connects label node 532 and image node 504. Similarly, label 534 ("vacation") of label node 536 has been determined for the image of image node 504 and for the image of image node 522, so one edge connects label node 536 and image node 504, and another edge connects label node 536 and image node 522.

Figure 5B:
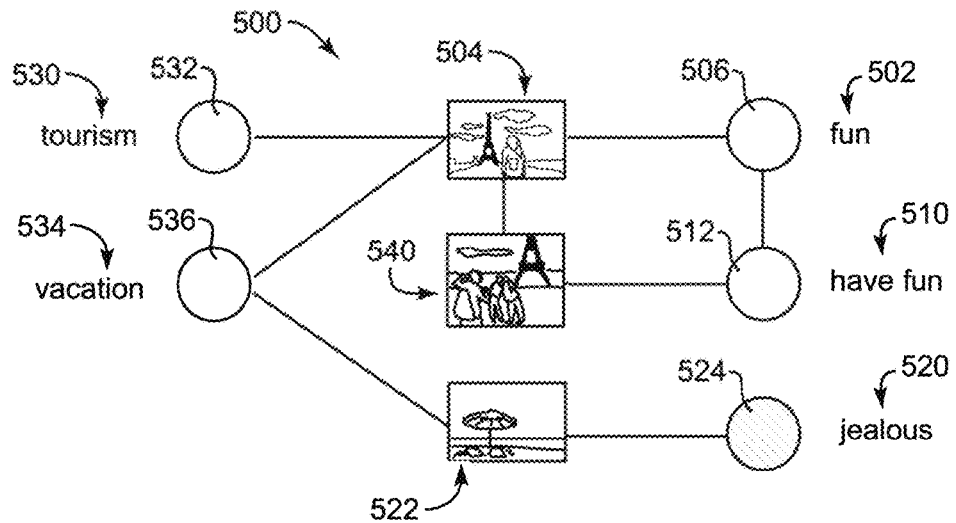

In FIG. 5B, an image has been added to the set of examined data, shown as image node 540. Images at image node 504 and image node 540 are determined to be visually similar to each other (e.g., similar visual content is depicted in each associated image, such as a similar monument), and so an edge connects these image nodes. The response 510 occurred for the image at image node 540, as indicated by the edge 542 connecting image node 540 and response node 512 of response 510. In some implementations, the response 510 did not occur with respect to the image of image node 540, and the system can determine the edge 542 based on the similarity between image nodes 504 and 540 and the relatedness between response nodes 506 and 512.

Figure 5C:
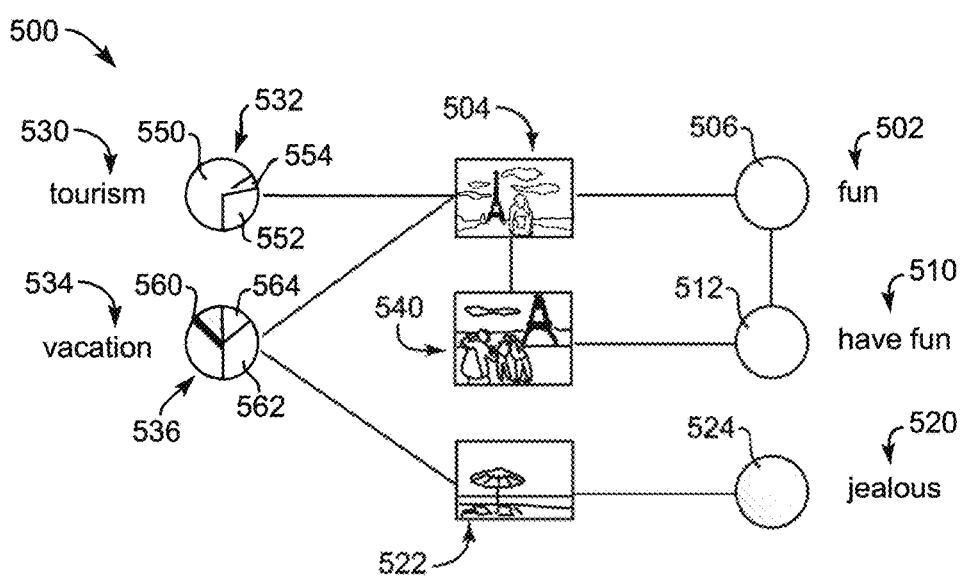

In FIG. 5C, seed labels (e.g., identity labels) have been assigned to the response nodes 506, 512, and 524, and graph-based learning has been performed for the graph 500. As a result, the label node 532 has been assigned a label distribution that includes a highest contribution 550 from the response node 506, due to the direct relationship of the response 502 occurring for the image of image node 504 from which the label node 532 was obtained. In addition, the seed label distribution for label node 532 includes a contribution 552 of the response 510, e.g., due to the edge between the image nodes 504 and 540, and due to the edge between the response nodes 506 and 512. Furthermore, the label distribution of label node 532 includes a contribution 554 of the response 520, e.g., due to the image node 504 that is common to both label node 532 and 536, causing these label nodes to be related. The label node 536 has a direct relationship with response 520 since response 520 occurred for the image of image node 522, and the label node 536 was obtained from the image of image node 522. In some implementations, in label node 532, the contribution 554 from label 520 is smaller than the contribution 552 from response 510. For example, this can be due to the higher number (and/or higher weight) of relationships between the label node 532 and nodes connected to response 510, in comparison the relationships between the label node 532 and nodes connected to response 520.

Similarly, label node 536 includes a response seed label distribution that has a highest contribution 560 from the response node 524 due to the direct relationship with label 520. In addition, label node 536 includes a smaller contribution 562 of the response node 506, e.g., due to a lower weighting of the connections to the response node 506. For example, the response 502 of response node 506 may be a less frequent response to the image of image node 504 than the response 520 of response node 524 is a response to the image of image node 522. Label node 536 includes an even smaller contribution 564 of the response node 512, due to the more tangential connection of label node 536 to the response node 512 in the graph (e.g., via nodes 504 and 506).

The system can use the response seed label contributions to the label nodes 532 and 536 (e.g., the distribution of responses for a label node) in determining message suggestions for a newly-obtained image (as in block 210 of FIG. 2). For example, in some implementations, if the "tourism" label is determined from a newly-obtained image, message suggestions can include responses that have a particular threshold contribution to the label node for the "tourism" label. In an example referring to FIG. 5C, the responses 502 and 510 may have contributions 550 and 552 that are above the threshold associated with the "tourism" label node 532, and thus these responses can be included in a list of suggested messages generated for the image (e.g., ranked based on their contribution amount). The contribution 554 of response 520 may be below the threshold, such that the response 520 is not included in the list of suggested messages for the image.

In some implementations, the graph can be built using particular parameters. For example, a "fix_seeds" parameter can be set to a value (e.g., true), which if true causes seeds to be treated as absolutely clean. A "neighbor_penalty" parameter can be set to a value (e.g., 0.1) within a range, which is a disagreement penalty across neighbors in the graph. A "normalize_edge_weights" parameter can be set to a value (e.g., false), which if true causes edges to be normalized to sum up to 1 (this can be disabled if edges are already normalized in graph construction, e.g., using the contrib_observed hyperparameter). A "normalize_label_weights" parameter can be set to a value (e.g., true), which if false causes optimization of a multiple-label problem and if true causes labels to compete with each other. A "sparse_k" parameter can be set to a value (e.g., 100) that indicates a number of labels (e.g., seed labels or other labels) per node for sparse approximation.

The graph-based learning can cause more relevant responses to be assigned higher probabilities. In another example, for the label "dessert," the probability obtained from a set of examined data for the response "i want one" was 0.0009 when using the PMI and association threshold described above without using the graph-based learning, and the probability obtained when using graph-based learning was 0.007. Similarly, the probabilities for the response "enjoy" was 0.0017 and 0.004, respectively; for the response "where did you get that?" was 0.0003 and 0.003, respectively; and for the response of a particular smiley face emoji, was 0.0009 and 0.002, respectively. Thus, the graph-based learning provided higher probabilities for more relevant responses than some techniques not using the graph-based learning.

Use of Taxonomy and Grammars

Message suggestions can also be generated based on a stored, hierarchical taxonomy of concepts accessible to the concept identifier 120 and the mapping model component 308. In some implementations, one or more grammars (e.g., each grammar being a set of particular rules governing the composition of message suggestions) can be used that can leverage such taxonomy in order to increase coverage and diversity of message suggestions over message suggestions obtained from training message data as described above. In some examples, a number of grammars can be predefined (e.g., by humans) and stored in accessible storage to allow the mapping model component to determine message suggestions for an image based on related concepts stored in the taxonomy. Some implementations can use a constructed graph as described herein to determine suggested responses, and these suggested responses can be provided as the output in one or more grammars. In various implementations, the responses for grammars can be sampled randomly from possible responses from the graph for a particular concept, and/or the responses can be sampled from the possible responses based on the probability distribution of responses produced by the graph for that concept. For example, higher-probability (e.g., over a threshold probability) responses, where probabilities are determined based on the training message data, can be selected for the grammars.

The system can check for any particular available grammars that use concepts that are related to detected concepts, and use such grammars. For example, grammars can be selected that use concepts at the same, lower, and/or higher level in the taxonomy than a detected concept. In some examples, an image depicting a terrier dog may cause the concept identifier 120 to determine a concept "terrier" and no other concepts. Even if there are no predetermined grammars available that are explicitly designated for the "terrier" concept, the mapping model component 308 can produce message suggestions using more generic grammars applied to the concept using the taxonomy. For example, a stored grammar may specify that if concept c is detected from an image i, and c is a child concept of the concept "dog" in the hierarchy of the referenced taxonomy, then "Cute" [c] can be output as a message suggestion. In this example, c is instantiated to "terrier," and the generated message suggestion is "Cute terrier." In some examples, this grammar can be expressed as:

for i, c: Detected(i, c) and Parent(c, dog)=>"Cute" c

Figure 6:
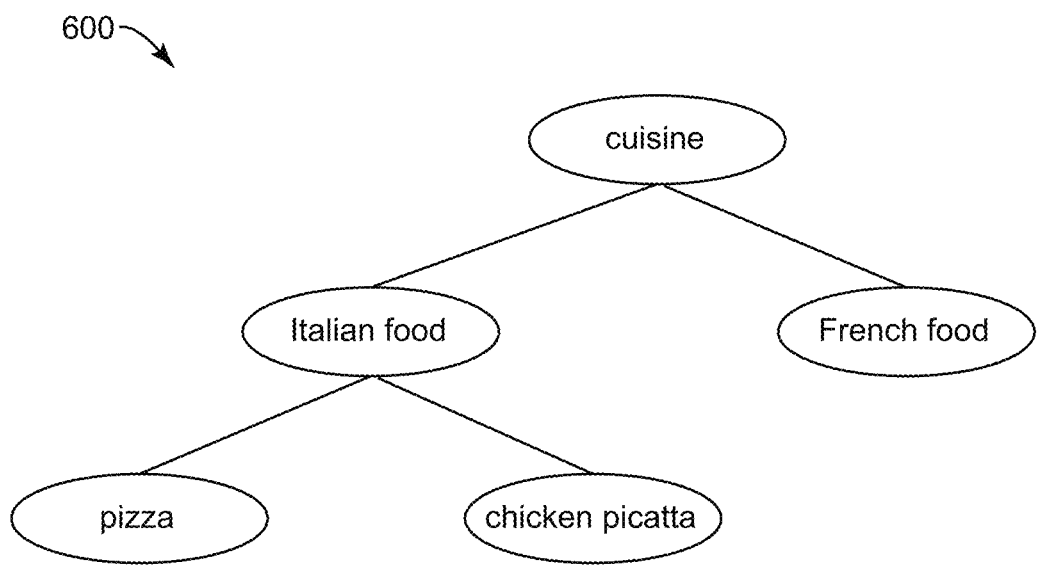
FIG. 6 is a block diagram illustrating an example hierarchical taxonomy of concepts.

FIG. 6 shows an example of a hierarchical taxonomy 600 of concepts. In this example, a single label of "chicken picatta" is the only label detected in an image by the concept identifier 120. Even if there is no explicit grammar available for this label, there may be one or more grammars available for a related concept such as "cuisine," which, for example, is determined to be a grandparent of "chicken picatta" in the taxonomy 600.

For example, the grammar may state that if a concept c is detected, and c is a child concept of a parent concept, and the parent concept is a child concept of the concept "cuisine," then a message suggestion will be generated to be "Love" [parent concept]. In the example in which the concept c is "chicken picatta," and the taxonomy shown in FIG. 5 is used, the message suggestion is therefore "Love Italian food" since "Italian food" is a parent of "chicken picatta."

In some implementations, grammars can be first-order expressions of an example form:

for i, c, p_1, ..., p_n, o: Detected(i,c) and Parent(c, p_1) and ... and Parent(p_{n-1}, p_n) and (o=c or o=p_1 or ... or o=p_n)=>string(o)

where Detected(i,c) denotes that semantic label c was extracted from image i, Parent(a,b) is a relation denoting that b is a parent of a in the taxonomy, and string(o) represents a string that includes the output label o. In this example, the label o is either the detected concept from the image or one of its ancestors in the taxonomy.

In some implementations, grammars can be implemented in two parts: a trigger (e.g., condition) and an application. The trigger specifies when a particular grammar applies to an image, e.g., the antecedent in the definition of grammar above. The application specifies the message suggestion to output, e.g., the consequent string(o) in the definition above.

In some examples, a trigger can include the following fields:

triggering_entity: this corresponds to the concept p_n in the definition above. Concept p_n can be an ancestor of the detected concept c. The concept p_n itself may not necessarily be detected in the image. For example, if triggering_entity for a grammar is "dog," a "poodle" label is detected in the image, and the system determines that "poodle" is a subtype of "dog" in the taxonomy (e.g., "poodle" is a child of "dog"), the trigger will activate and the grammar is used, even if "dog" is not explicitly a detected concept.

detected_entity_level: specifies the hierarchical distance (e.g., number of hierarchical levels) in the taxonomy hierarchy between the triggering_entity and the concept detected in the image. This corresponds to n in the definition above. In some implementations, a threshold (e.g., maximum) number of taxonomy levels can be specified for a grammar, such that the grammar is triggered if the number of hierarchical levels between the triggering_entity and the detected concept is at or below the maximum number.

output_label_level specifies the hierarchical distance (e.g., number of levels) below the triggering_entity level of the label that is to be used in the output. It can be used to identify the output label o in string(o) in the definition above.

In some examples, the grammar application specifies how to generate a message suggestion, e.g., how to produce string(o). It can include a response_pattern string which has a placeholder (e.g., "% s") for the output label. For example, if the label o is "terrier" and the response pattern is "Cute % s", the produced response is "Cute terrier."

In some implementations, grammars can be loaded in system memory and indexed by the entity (concept) level and taxonomy level. In some examples, at runtime, concepts are detected in the image and grammars are checked for a trigger using the following flow:

1) Initialize current_entity_id=entity_in_image, current_level=0.

2) Check if the (current_entity_id, current_level) level has an entry in the grammar map. If so, apply the grammar.

3) Fetch the parents for current_entity_id. For each parent, rerun the flow from step 1 with current_entity_id=parent_id, and current_level=current_level+1.

The above recursion can traverse the entire parent taxonomy hierarchy, checking for grammars that should trigger, and may terminate when the root node of the taxonomy is reached. In some implementations, specified subsets or ranges of hierarchical levels can be specified to traverse, e.g., instead of traversing the entire hierarchy.

Message Suggestions to Use Bots

In some implementations, one or more message suggestions generated by the system can be messages used to invoke or command a bot, e.g., request a bot for information. For example, the system can determine whether a received image includes content that would be assisted by information and/or one or more functions provided by a bot. In an example, the first user in the conversation may send a text message to the second user, saying, "Guess where?" The first user then sends an image to the second user's device. The system can determine that a phrase including one or more predefined words (e.g., the word "guess") indicates that a suggested message response can be a request to find out the information related to the image content. Other predefined words can also indicate such a request, such as "where," "what," etc. In response, the system can generate a message suggestion that is a request or command to an appropriate bot that can provide the relevant information. For example, a message suggestion can be a request to a mapping bot to provide the name of the location depicted in the image (e.g., the bot can determine such information using web searches, maps and atlases, geographic location metadata of the received image, etc.). In some implementations, the training message data can be used (if user consent has been obtained) to determine appropriate types of bots that have been previously associated with particular types of image content, and/or rules-based grammars can define and determine which bots to include in a message suggestion based on the concepts determined in the image content.

In some implementations, if the bot-related message suggestion is displayed for the user as a possible message response and the user selects that suggestion, the bot can be added to the message conversation and messaging interface, e.g., displayed as a participating "user" in a messaging interface and represented with a bot name. The bot can determine and output the requested information in the conversation, e.g., as messages to both the first and second users in a messaging user interface.

In another example, the first user sends an image depicting text that is in a language foreign to the second user. The system can determine that an appropriate message suggestion is a request to a language bot to translate the text in the image and to output the translated text in the message conversation interface.

In another example, the first user sends an image depicting a food item. The system can determine that an appropriate message suggestion is a request to a bot to check one or more accessible data sources (e.g., on the Internet) to determine the ingredients and/or calories typically or specifically included in the food item, and to output that information in the message conversation interface.

Figure 7:
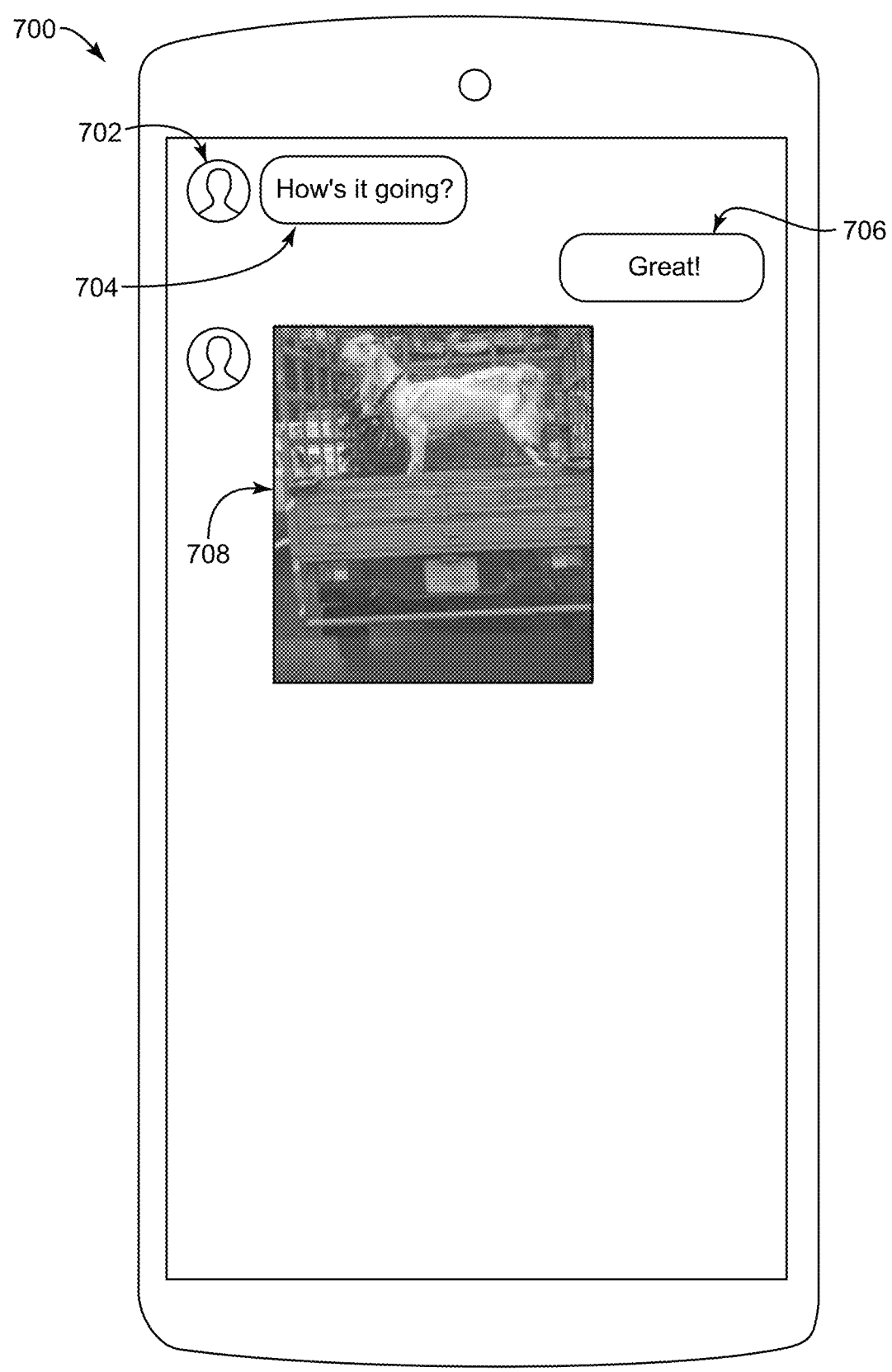
FIG. 7 is a graphic representation of an example client device displaying a user interface in which a messaging application is used for a conversation between users.

FIG. 7 is a graphic representation of an example client device 700 displaying a user interface in which a messaging application is used for a conversation between users. In this example, a first user and a second user are participating in a chat via their client devices, where the second user is operating the client device 700. The first user, represented by displayed icon 702, sends a message 704 to the second user as displayed in the user interface. The second user has input and responded with a message 706 which is displayed in the user interface. In response, the first user selects and sends image 708 to the second user, where the image 708 is displayed in the user interface after (e.g., below) the previous messages. In some examples, the first user of icon 702 is a human user. In some implementations, the first user of icon 702 may be a bot.

In some implementations, the first user sends messages to the second user by messaging a phone number (e.g., when the messaging application 103 works over SMS, or the messaging application utilizes phone numbers) or selecting the user from a contacts list (e.g., when the messaging application 103 works over rich communications services (RCS) or another chat interface).

Figure 8:
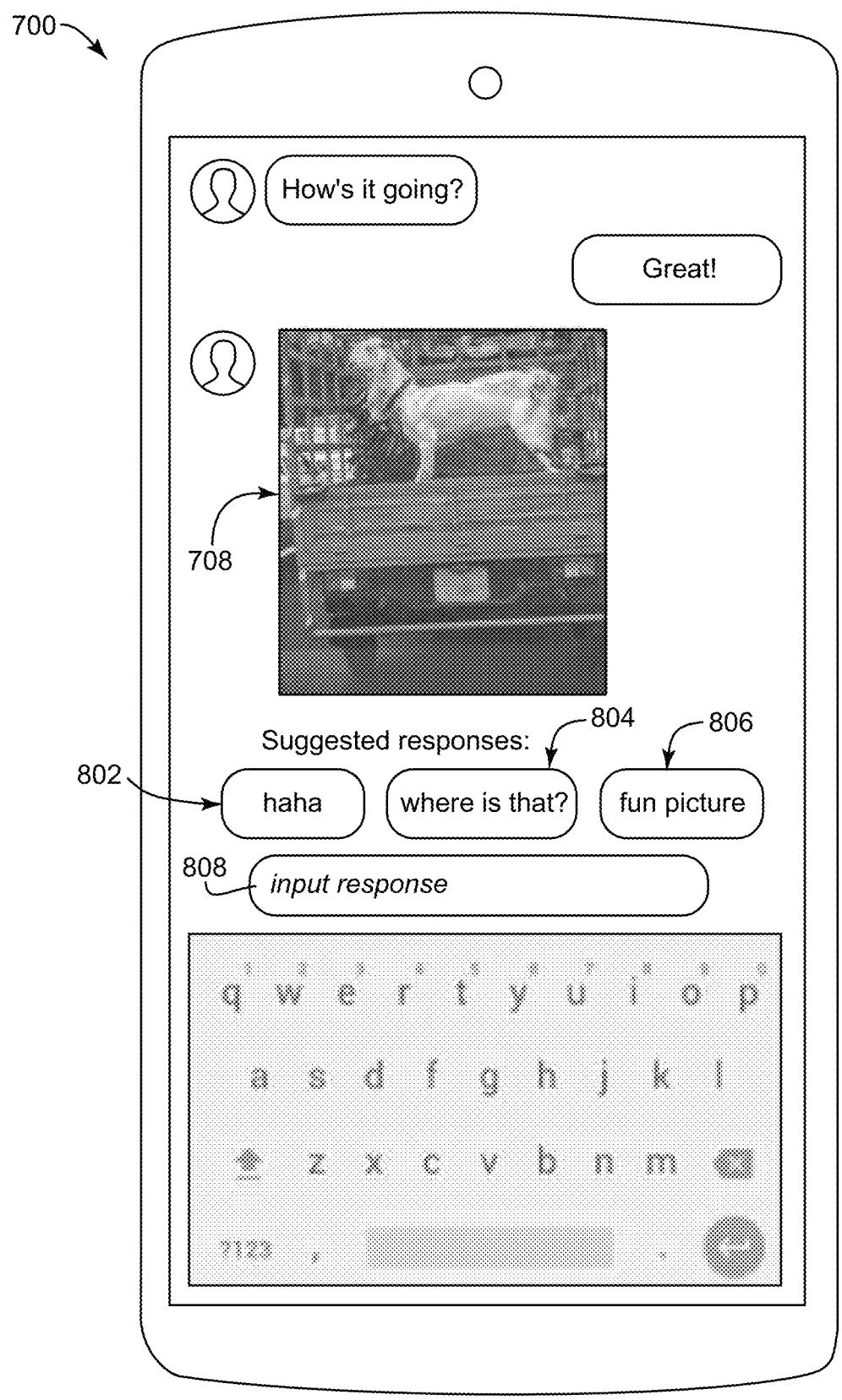
FIG. 8 is a graphic representation of the example client device of FIG. 7 with a conversation in a messaging application that includes generated message suggestions.

FIG. 8 is a graphic representation of the example client device 700 and user interface of FIG. 7 with a conversation in a messaging application that includes generated message suggestions. The conversation illustrated in FIG. 8 is the same as that in FIG. 7. As seen in FIG. 8, the messaging application 103 provides one or more message suggestions to the second user to select as a response to receiving the image, e.g., by using the method illustrated in FIG. 2. For example, suggested response 802 (having the text "haha"), suggested response 804 (having the text "where is that?"), and suggested response 806 (having the text "fun picture") are displayed in the user interface as options for the second user to select to respond to the message. Upon selection of one of the suggested responses 802, 804, and 806, the response can be transmitted to the device of the first user. For example, the suggested responses 802, 804, and 806 are displayed under the received image 708 in FIG. 8, but can be displayed in any of a variety of locations in the user interface (e.g., above, to the side, or surrounding the image 708, in a separate displayed field or window, etc.).

In the example shown in FIG. 8, the image has been recognized to include a goat, which may be a semantic concept (e.g., in a taxonomy under animals→goat). Further, the image has also been determined to include a truck (e.g., in the taxonomy under vehicles→truck). One or more of the suggested responses may be determined based on previous responses provided by users to images depicting the concepts of "goat" and/or "truck" as indicated in examined message data. One or more of the suggested responses may be determined based on stored grammars, e.g., a grammar related to a concept of "goat" and/or related to a concept of "animal", related to the combination of objects "goat" and "truck," or their parent concepts, etc.

In some implementations, a user can input a response instead of selecting one of the suggested responses 802, 804, and 806. For example, the user can provide input to a displayed keyboard via the touchscreen of the client device 700, where the input response is displayed in field 808 as it is being input, before being sent to the device of the first user. In some implementations, the second user can selection one of the suggested responses 802, 804, and 806 and the selected suggested response is displayed in field 808, where the second user can edit this suggested response using the displayed keyboard or other input device.

Figure 10:
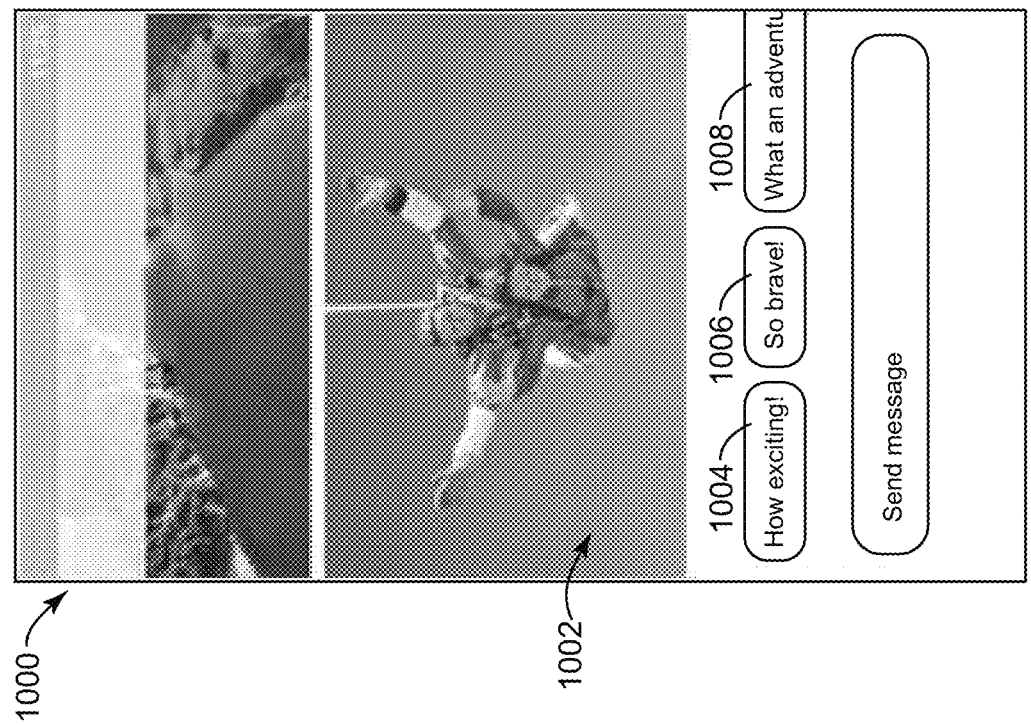
FIGS. 9-11 are graphic representations of examples of user interfaces displaying suggested responses to received images, according to some implementations.
Figure 9:
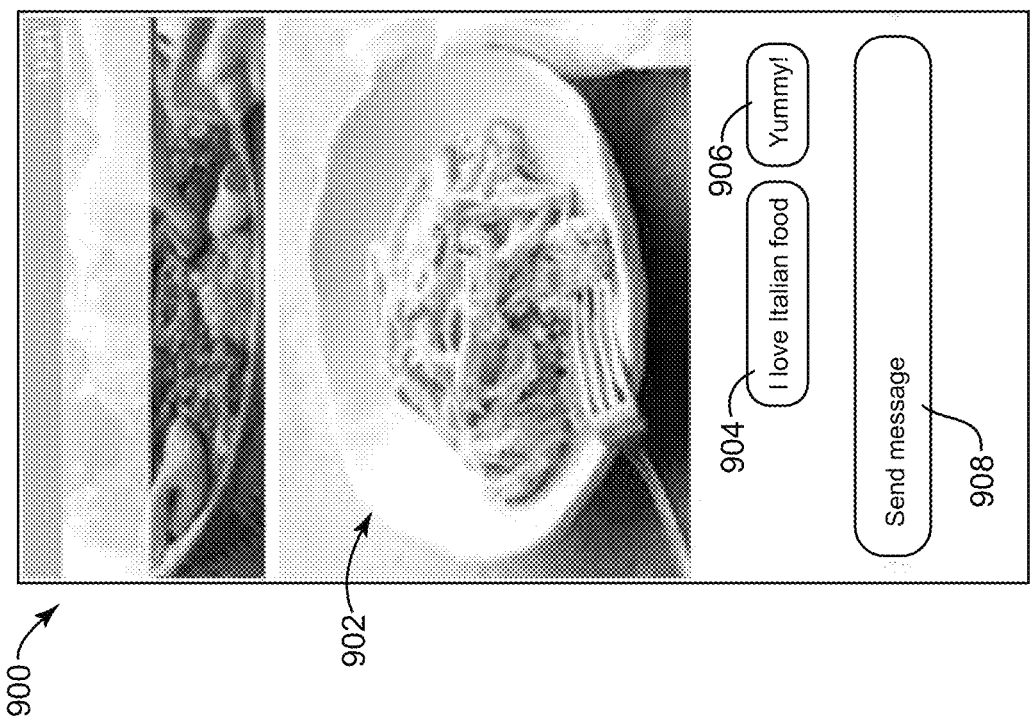
Figure 11:
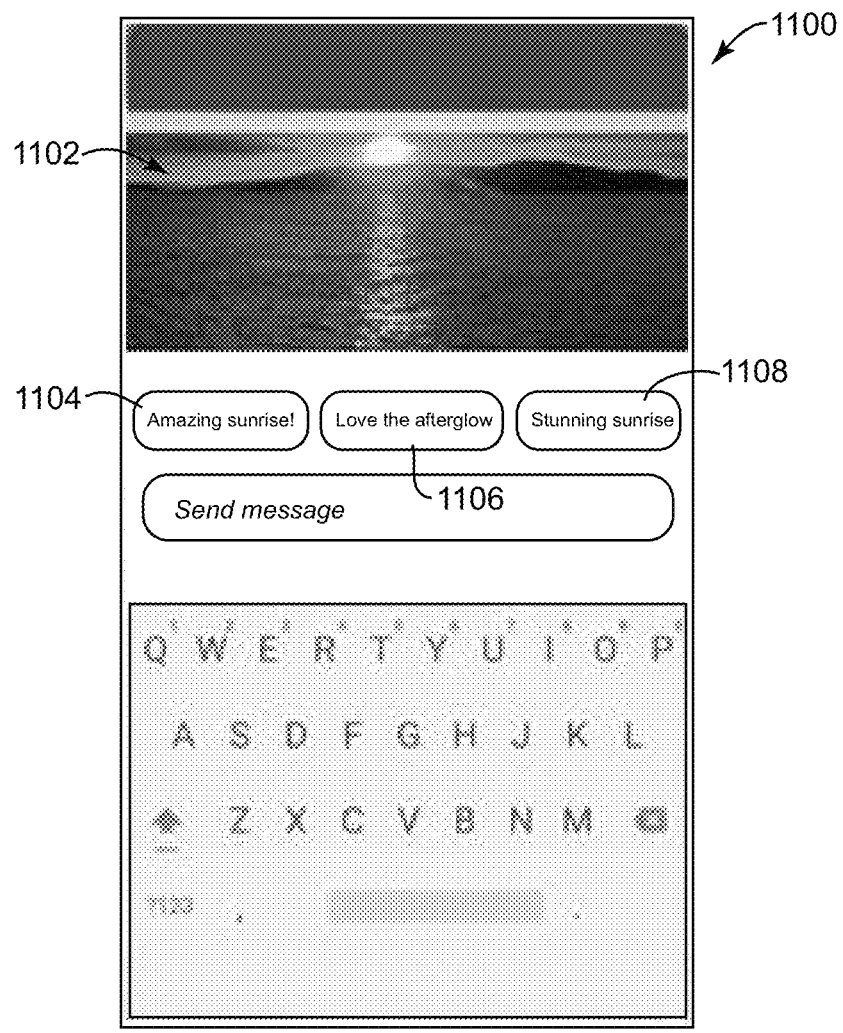

FIGS. 9, 10, and 11 illustrate additional examples of suggested responses to receiving an image, e.g., from a different user device. The suggested responses are displayed in user interfaces of a messaging application and can be generated by or for the messaging application using one or more features described herein. FIG. 9 illustrates a user interface 900 that displays an image 902 and two suggested responses 904 and 906 that are generated based on detected concepts in the image 902 including "Italian food." One of the responses 904 and 906 can be selected to send that response (e.g., a confirmation prompt can be displayed to request that the user confirm that the selected suggested response is to be sent). A message field 908 can alternatively be used by the user to input a text message to send to the user.

FIG. 10 similarly illustrates a user interface 1000 that displays an image 1002 and three suggested responses 1004, 1006, and 1008 that have been generated based on detected concepts in the image 1002 including "skydiving."

FIG. 11 similarly illustrates a user interface 1100 that displays an image 1102 and three suggested responses 1104, 1106, and 1108 that have been generated based on detected concepts in the image 1102 including "sunset." In some implementations, the concept "sunset" may be determined also based on a timestamp metadata associated with the image 1102 indicating a time of capture of the image 1102. For example, the timestamp can indicate a time within a time range at the end of a day and before dark, thus indicating a sunset rather than a sunrise.

Bot Implementations

One or more bots can be implemented with one or more features described herein, e.g., bots can be implemented by or accessed by one or more components of environment 100 of FIG. 1. A bot is an automated service, implemented on one or more computers, that users interact with, e.g., through text, such as via messaging application 103a/103b (see FIG. 1) or other applications, etc. A bot may be implemented by a bot provider such that the bot can interact with users of various messaging applications. In some implementations, a provider of messaging application 103a/103b may also provide one or more bots. In some implementations, bots provided by the provider of messaging application 103a/103b may be configured such that the bots can be included in other messaging applications, e.g., provided by other providers. A bot may provide several advantages over other modes. For example, a bot may permit a user to try a new service (e.g., a taxi booking service, a restaurant reservation service, etc.) without having to install an application on a client device, or accessing a website. Further, a user may interact with a bot via text, which requires minimal or no learning compared with services used via a website, software application, a telephone call, e.g., to an interactive voice response (IVR) service, or other manners of interacting with a service. Incorporating a bot within a messaging service or application may also permit users to collaborate with other users to accomplish various tasks such as travel planning, shopping, scheduling events, obtaining information, etc. within the messaging service, and eliminate cumbersome operations such as switching between various applications (e.g., a taxi booking application, a restaurant reservation application, a calendar application, etc.) or websites to accomplish the tasks.

A bot may be implemented as a computer program or application (e.g., a software application) that is configured to interact with one or more users (e.g., any of the users 125a-n) via messaging application 103a/103b to provide information or to perform specific actions within the messaging application 103. As one example, an information retrieval bot may search for information on the Internet and present the most relevant search result within the messaging app. As another example, a travel bot may have the ability to make travel arrangements via messaging application 103, e.g., by enabling purchase of travel and hotel tickets within the messaging app, making hotel reservations within the messaging app, making rental car reservations within the messaging app, and the like. As another example, a taxi bot may have the ability to call a taxi, e.g., to the user's location (obtained by the taxi bot from client device 115, when a user 125 permits access to location information) without having to invoke or call a separate taxi reservation app. As another example, a coach/tutor bot may tutor a user to instruct the user in some subject matter within a messaging app, e.g., by asking questions that are likely to appear on an examination and providing feedback on whether the user's responses were correct or incorrect. As another example, a game bot may play a game on the opposite side or the same side as a user within a messaging app. As another example, a commercial bot may provide services from a specific merchant, e.g., by retrieving product information from the merchant's catalog and enabling purchase through a messaging app. As another example, an interface bot may interface a remote device or vehicle so that a user of a messaging app can chat with, retrieve information from, and/or provide instructions to the remote device or vehicle.

A bot's capabilities may include understanding a user's intent and executing on it. The user's intent may be understood by analyzing and understanding the user's conversation and its context. A bot may also understand the changing context of a conversation or the changing sentiments and/or intentions of the users based on a conversation evolving over time. For example, if user A suggests meeting for coffee but if user B states that he does not like coffee, then a bot may assign a negative sentiment score for coffee to user B and may not suggest a coffee shop for the meeting.

Implementing bots that can communicate with users of messaging application 103a/103b may provide many advantages. Conventionally, a user may utilize a software application or a website to perform activities such as paying bills, ordering food, booking tickets, etc. A problem with such implementations is that a user is required to install or use multiple software applications, and websites, in order to perform the multiple activities. For example, a user may have to install different software applications to pay a utility bill (e.g., from the utility company), to buy movie tickets (e.g., a ticket reservation application from a ticketing service provider), to make restaurant reservations (e.g., from respective restaurants), or may need to visit a respective website for each activity. Another problem with such implementations is that the user may need to learn a complex user interface, e.g., a user interface implemented using multiple user interface elements, such as windows, buttons, checkboxes, dialog boxes, etc.

Consequently, an advantage of one or more described implementations is that a single application enables a user to perform activities that involve interaction with any number of parties, without being required to access a separate website or install and run software applications, which has a technical effect of reducing consumption of memory, storage, and processing resources on a client device. An advantage of the described implementations is that the conversational interface makes it easier and faster for the user to complete such activities, e.g., without having to learn a complex user interface, which has a technical effect of reducing consumption of computational resources. Another advantage of the described implementations is that implementing bots may enable various participating entities to provide user interaction at a lower cost, which has a technical effect of reducing the need for computational resources that are deployed to enable user interaction, such as a toll-free number implemented using one or more of a communications server, a website that is hosted on one or more web servers, a customer support email hosted on an email server, etc. Another technical effect of described features is a reduction in the problem of consumption of system processing and transmission resources required for completing user tasks across communication networks.

While certain examples herein describe interaction between a bot and one or more users, various types of interactions, such as one-to-one interaction between a bot and a user 125, one-to-many interactions between a bot and two or more users (e.g., in a group messaging conversation), many-to-one interactions between multiple bots and a user, and many-to-many interactions between multiple bots and multiple users are be possible. Further, in some implementations, a bot may also be configured to interact with another bot (e.g., bots 107a/107b, 109a/109b, 111, 113, etc.) via messaging application 103, via direct communication between bots, or a combination. For example, a restaurant reservation bot may interact with a bot for a particular restaurant in order to reserve a table.

In certain embodiments, a bot may use a conversational interface to use natural language to interact conversationally with a user. In certain embodiments, a bot may use a template-based format to create sentences with which to interact with a user, e.g., in response to a request for a restaurant address, using a template such as "the location of restaurant R is L." In certain cases, a user may be enabled to select a bot interaction format, e.g., whether the bot is to use natural language to interact with the user, whether the bot is to use template-based interactions, etc.

In cases in which a bot interacts conversationally using natural language, the content and/or style of the bot's interactions may dynamically vary based on one or more of: the content of the conversation determined using natural language processing, the identities of the users in the conversations, and one or more conversational contexts (e.g., historical information on the user's interactions, connections between the users in the conversation based on a social graph), external conditions (e.g., weather, traffic), the user's schedules, related context associated with the users, and the like. In these cases, the content and style of the bot's interactions is varied based on only such factors for which users participating in the conversation have provided consent.

As one example, if the users of a conversation are determined to be using formal language (e.g., no or minimal slang terms or emojis), then a bot may also interact within that conversation using formal language, and vice versa. As another example, if a user in a conversation is determined (based on the present and/or past conversations) to be a heavy user of emojis, then a bot may also interact with that user using one or more emojis. As another example, if it is determined that two users in a conversation are in remotely connected in a social graph (e.g., having two or more intermediate nodes between them denoting, e.g., that they are friends of friends of friends), then a bot may use more formal language in that conversation. In the cases where users participating in a conversation have not provided consent for the bot to utilize factors such as the users' social graph, schedules, location, or other context associated with the users, the content and style of interaction of the bot may be a default style, e.g., a neutral style, that doesn't require utilization of such factors.

Further, in some implementations, one or more bots may include functionality to engage in a back-and-forth conversation with a user. For example, if the user requests information about movies, e.g., by entering "@moviebot Can you recommend a movie?", the bot "moviebot" may respond with "Are you in the mood for a comedy?" The user may then respond, e.g., "nope" to which the bot may respond with "OK. The sci-fi movie entitled Space and Stars has got great reviews. Should I book you a ticket?" The user may then indicate "Yeah, I can go after 6 pm. Please check if Steve can join". Upon user's consent to the bot accessing information about their contacts and upon the friend Steve's consent to receiving messages from the bot, the bot may send a message to user's friend Steve and perform further actions to book movie tickets at a suitable time.

In certain embodiments, a user participating in a conversation may be enabled to invoke a specific bot or a bot performing a specific task, e.g., by typing a bot name or bot handle (e.g., taxi, @taxibot, @movies, etc.), by using a voice command (e.g., "invoke bankbot", etc.), by activation of a user interface element (e.g., a button or other element labeled with the bot name or handle), etc. Once a bot is invoked, a user 125 may send a message to the bot via messaging application 103a/103b in a manner similar to sending messages to other users 125. For example, to order a taxi, a user may type "@taxibot get me a cab"; to make hotel reservations, a user may type "@hotelbot book a table for 4 at a Chinese restaurant near me."

In certain embodiments, a bot may automatically suggest information or actions within a messaging conversation without being specifically invoked. That is, the users may not need to specifically invoke the bot. In these embodiments, if user consent has been obtained, the bot may depend on analysis and understanding of the conversation on a continual basis or at discrete points of time. The analysis of the conversation may be used to understand specific user needs and to identify when assistance should be suggested by a bot. As one example, a bot may search for some information and suggest the answer if it is determined that a user needs information (e.g., based on the user asking a question to another user, based on multiple users indicating they don't have some information). As another example, if it is determined that multiple users have expressed interest in eating Chinese food, a bot may automatically suggest a set of Chinese restaurants in proximity to the users, including optional information such as locations, ratings and links to the websites of the restaurants.

In certain embodiments, rather than automatically invoking a bot or waiting for a user to explicitly invoke a bot, an automatic suggestion may be made to one or more users in a messaging conversation to invoke one or more bots. In these embodiments, if user content has been obtained, the conversation may be analyzed on a continual basis or at discrete points of time, and the analysis of the conversation may be used to understand specific user needs and to identify when a bot should be suggested within the conversation. For example, particular keywords, phrases, or exchanges of words or phrases in the messaging conversation can be detected by a program executing on a device participating in the message conversation, where such keywords or phrases can indicate to invoke a bot and add the bot to the messaging conversation.

In the embodiments in which a bot may automatically suggest information or actions within a messaging conversation without being specifically invoked, such functionality is disabled, e.g., if one or more users participating in the messaging conversation do not provide consent to a bot performing analysis of the user's conversation. Further, such functionality may also be disabled temporarily based on user input. For example, when the users indicate that a conversation is private, analysis of conversational context is suspended until users provide input for the bot to be activated. Further, indications that analysis functionality is disabled may be provided to participants in the conversation, e.g., with a user interface element.

In various implementations, a bot may be implemented in a variety of configurations. For example, as shown in FIG. 1, bot 105 is implemented on client device 115a. In this example, the bot may be a module in a software application that is local to client device 115a. For example, if a user has installed a taxi hailing application on client device 115a, bot functionality may be incorporated as a module in the taxi hailing application. In this example, a user may invoke a taxi bot, e.g., by sending a message "@taxibot get me a cab." Messaging application 103b may automatically cause the bot module in the taxi hailing application be launched. In this manner, a bot may be implemented locally on a client device such that the user can engage in conversation with the bot via messaging application 103.

In another example shown in FIG. 1, bot 107a is shown implemented on client device 115a and bot 107b is shown as implemented on messaging server 101. In this example, the bot may be implemented, e.g., as a client-server computer program, with portions of the bot functionality provided by each of bot 107a (server module) and bot 107b (client module). For example, if the bot is a scheduling bot with the handle @calendar, user 125a may schedule a reminder, by typing "@calendar remind me to pick up laundry in the evening," which may be handled by bot 107b (client module). Continuing with this example, if user 115a tells the bot "check if Jim is free to meet at 4," bot 107a (server module) may contact user Jim (or Jim's scheduling bot) to exchange messages, and provide a response to user 115a.

In another example, bot 109a (server module) is implemented on server 135 and bot 109b (client module) is implemented on client devices 115. In this example, the bot functionality is provided by modules implemented on client devices 115 and server 135, which is distinct from messaging server 101. In some implementations, a bot may be implemented as a distributed application, e.g., with modules distributed across multiple client devices and servers (e.g., client devices 115, server 135, messaging server 101, etc.). In some implementations, a bot may be implemented as a server application, e.g., bot 111 that is implemented on messaging server 101 and bot 113 that is implemented on server 135.

Different implementations such as client-only, server-only, client-server, distributed, etc. may provide different advantages. For example, client-only implementations permit bot functionality to be provided locally, e.g., without network access, which may be advantageous in certain contexts, e.g., when a user is outside of network coverage area or in any area with low or limited network bandwidth. Implementations that include one or more servers, such as server-only, client-server, or distributed configurations may permit certain functionality, e.g., financial transactions, ticket reservations, etc. that may not be possible to provide locally on a client device.

While FIG. 1 shows bots as distinct from messaging application 103, in some implementations, one or more bots may be implemented as part of messaging application 103. In the implementations in which bots are implemented as part of messaging application 103, user permission is obtained before implementing bots. For example, where bots are implemented as part of messaging application 103a/103b, messaging application 103a/103b may provide bots that can perform certain activities, e.g., a translation bot that translates incoming and outgoing messages, a scheduling bot that schedules events on a user's calendar, etc. In this example, translation bot is activated only upon user's specific permission. If the user does not provide consent, bots within messaging application 103a/103b are not implemented (e.g., disabled, removed, etc.). If the user provides consent, a bot or messaging application 103a/103b may make limited use of messages exchanged between users via messaging application 103a/103b to provide specific functionality, e.g., translation, scheduling, etc.

In some implementations, third parties distinct from a provider of messaging application 103a/103b and users 125, may provide bots that can communicate with users 125 via messaging application 103a/103b for specific purposes. For example, a taxi service provider may provide a taxi bot, a ticketing service may provide a bot that can book event tickets, a bank bot may provide capability to conduct financial transactions, etc.

In implementing bots via messaging application 103, bots are permitted to communicate with users only upon specific user authorization. For example, if a user invokes a bot, the bot can reply, e.g., based on the user's action of invoking the bot. In another example, a user may indicate particular bots or types of bots that may contact the user. For example, a user may permit travel bots to communicate with her, but not provide authorization for shopping bots. In this example, messaging application 103a/103b may permit travel bots to exchange messages with the user, but filter or deny messages from shopping bots.

Further, in order to provide some functionality (e.g., ordering a taxi, making a flight reservation, contacting a friend, etc.), bots may request that the user permit the bot to access user data, such as location, payment information, contact list, etc. In such instances, a user is presented with options to permit or deny access to the bot. If the user denies access, the bot may respond via a message, e.g., "Sorry, I am not able to book a taxi for you." Further, the user may provide access to information on a limited basis, e.g., the user may permit the taxi bot to access a current location only upon specific invocation of the bot, but not otherwise. In different implementations, the user can control the type, quantity, and granularity of information that a bot can access, and is provided with the ability (e.g., via a user interface) to change such permissions at any time. In some implementations, user data may be processed, e.g., to remove personally identifiable information, to limit information to specific data elements, etc. before a bot can access such data. Further, users can control usage of user data by messaging application 103a/103b and one or more bots. For example, a user can specify that a bot that offers capability to make financial transactions require user authorization before a transaction is completed, e.g., the bot may send a message "Tickets for the movie Space and Starts are $12 each. Shall I go ahead and book?" or "The best price for this shirt is $125, including shipping. Shall I charge your credit card ending 1235?" etc.

Implementations described herein generally relate to messaging applications. Certain implementations may automatically analyze image content of one or more messaging conversations and/or user information to automatically provide message suggestions to a user within a messaging application. In certain examples, the automatic suggestions may provide one or more appropriate responses to be selected by a user to respond in the messaging application, and/or may automatically send one or more appropriate responses on behalf of a user. In certain other examples, the suggestions may automatically incorporate particular non-messaging functionality into the messaging application.

While the foregoing description includes techniques to provide message suggestions in response to receiving an image, message suggestions may be provided in response to any type of media content that is received in a conversation. For example, such content may include stickers (e.g., in a chat application), animated images (e.g., cinemagraphs, GIF images, etc.), and videos. Further, while the foregoing description describes message suggestions as text responses, other types of responses may also be suggested, e.g., based on analysis of a received image. For example, other responses may include one or more of a suggested image, a suggested sticker, a suggested animated image (e.g., cinemagraph, GIF image, etc.) and a suggested video. To provide these suggestions, suggestion module 304 may perform, e.g., a comparison of identified concepts in a received item (e.g., text, image, video, sticker, animated image, etc.) with concepts in different types of responses, and select a suitable response, as described above with reference to message suggestions that include text. In different implementations where users provide consent, the type of response may be selected or prioritized based on context, e.g., a sticker may be selected as a suggested message in response to an incoming sticker, a video may be selected as a suggested response in response to an incoming image, etc.

Certain implementations enable messaging with human users and/or chat bots. In certain implementations, automatic message suggestions may be customized based on whether a chat bot is participating in the messaging conversation. In some examples, a first set of automatic message suggestions may be provided if a chat bot is absent in a messaging conversation, while a second set of automatic message suggestions may be provided if a chat bot is present in the messaging conversation, where the first and second sets of responses are at least partially different. For example, these implementations may employ conversational rules followed by the chat bot, and suggest messages to a user based on the rules. This can mitigate challenges that users may have in communicating with chat bots in a language and in a format that is easily understood by the chat bots.

Some implementations can include determining one or more trending responses (e.g., message responses including popular message content sent by many different users) based on other messages in at least one of a region, market, and country related to a location of a user. One or more determined message suggestions may include one or more trending responses. In some implementations, a user context, e.g., a geographic location, holiday or an event, etc., can be used to generate and determine for presentation one or more of the message suggestions.

Determining the suggested response may be further based on using machine learning to develop a personalized model for a user. Determining suggested responses may be based on preferences of the user and/or prior actions of the user in communications (if user consent for use of such actions and data has been obtained). For example, user preferences may include a whitelist indicating particular words which can be included and/or a blacklist indicating particular words which cannot be included in message suggestions. If user consent has been obtained, message suggestions can be generated or modified based on one or more of punctuation use, emoji use, or other content provided by the user on previous occasions.

Models, e.g., mapping models, used to provide message suggestions may be implemented by a client device 115 and/or a server 101. In some implementations, conversations may be encrypted such that only client devices of participants in the conversation can access conversation content. In these implementations, models implemented by a respective client device may be used to provide message suggestions and models implemented by a server are not used. Models implemented by a client device may also be used, e.g., when the user does not provide consent for use of models implemented by a server. In some implementations, client implemented models may be based on or derived from server implemented models. In some implementations, server models may be used and client models may not be used, e.g., when a client device lacks capability to implement client models. In some implementations, a combination of client and server models may be used.

While the examples described in this document utilize concepts illustrated in English, suggestions may be provided in any language, e.g., a language, locale or other geographic configured for a client device 115, a language selected based on a user preference, etc. In some implementations, where users provide consent for analysis of context of a conversation, a language that is used in various conversations (e.g., in recent messages) involving the user may be detected and message suggestions can be provided in that language.

Figure 12:
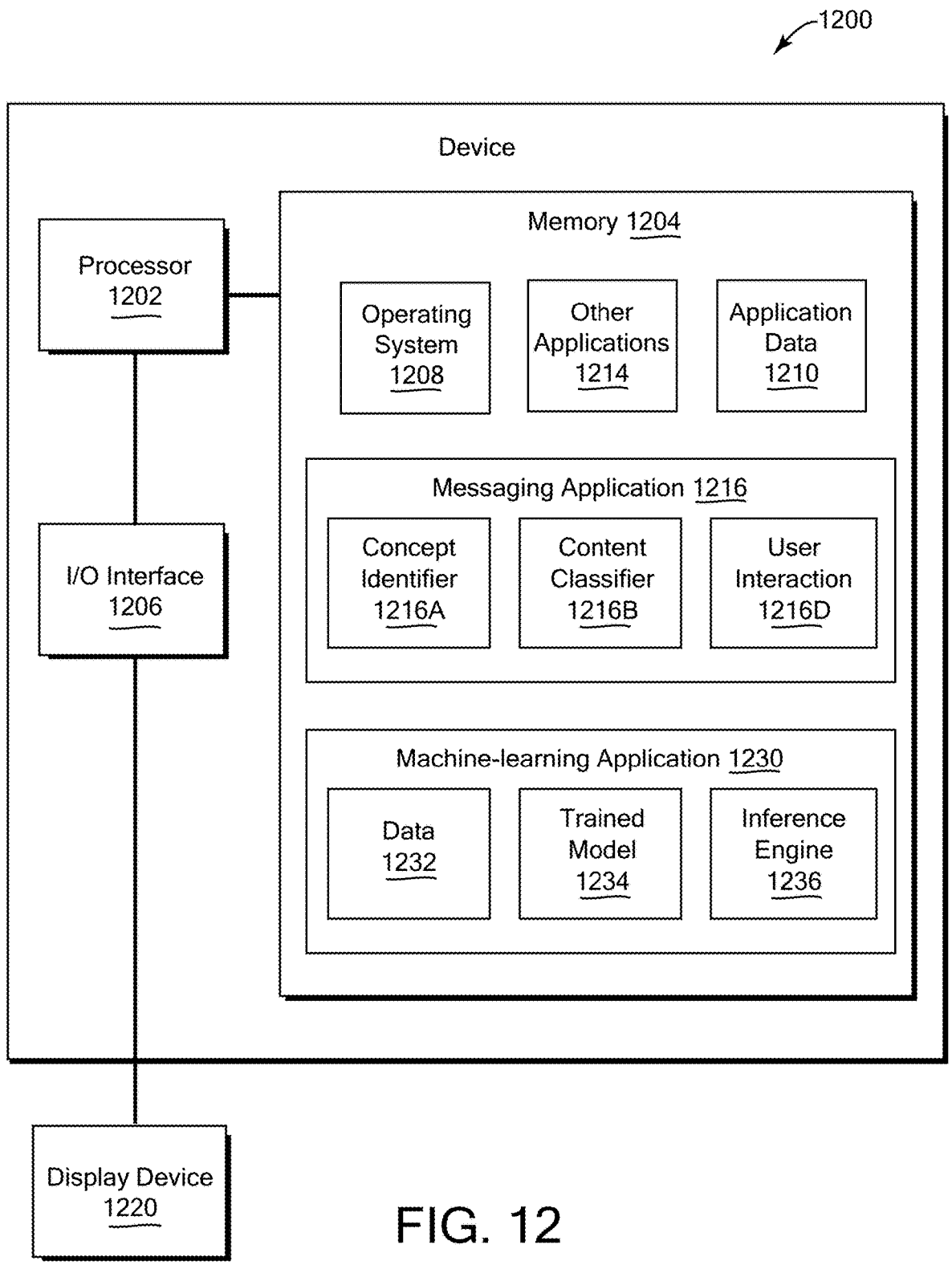
FIG. 12 is a block diagram of an example device which may be used for one or more implementations described herein.

FIG. 12 is a block diagram of an example device 1200 which may be used to implement one or more features described herein. In one example, device 1200 may be used to implement a client device, e.g., any of client devices 115 shown in FIG. 1. Alternatively, device 1200 can implement a server device, e.g., messaging server 101, concept identifier 120, and content classifier 130 of FIG. 1. Device 1200 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1200 includes a processor 1202, a memory 1204, and input/output (I/O) interface 1206. Processor 1202 can be one or more processors and/or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the server device 1200 by the processor 1202, including an operating system 1208, messaging application 1216 and other applications 1214 such as a data display engine, web hosting engine, image display engine, notification engine, social networking engine, etc. Application data 1210 can be stored in memory 1204 and input to and/or output from messaging application 1216 and/or 1214. For example, application data can include data described herein, such as exchanged messages, images, database data, configuration data, user preferences, etc.

In some implementations, the messaging application 1216 can include instructions that enable processor 1202 to perform functions described herein, e.g., some or all of the method of FIG. 2. For example, messaging application 1216 can provide message suggestions as described herein. In some implementations, messaging application 1216 may include one or more modules, such as concept identifier 1216A, content classifier 1216B, and user interaction module 1216C, and/or these modules can be implemented in other applications or devices in communication with the device 1200. Other applications 1214 (or engines) can also or alternatively be included, e.g., image editing applications, media display applications, communication applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc. One or more of the operating system 1208 and applications 1216 and 1214 can, for example, provide a displayed user interface responsive to user input to display selectable options or controls, and display data based on selected options.

A machine-learning application 1230 can be stored in memory 1204 in some implementations. In various implementations, machine-learning application 1230 may utilize Bayesian classifiers, support vector machines, neural networks, or other learning techniques. In some implementations, machine-learning application 1230 may include a trained model 1234, an inference engine 1236, and data 1232. In some implementations, data 1232 may include training data, e.g., data used to generate trained model 1234. For example, training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 1234, training data may include such user data. In implementations where users permit use of their respective user data, data 1232 may include permitted data such as images (e.g., photos or other user-generated images), communications (e.g., e-mail; chat data such as text messages, voice, video, etc.), documents (e.g., spreadsheets, text documents, presentations, etc.)

In some implementations, data 1232 may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 1230 excludes data 1232. For example, in these implementations, the trained model 1234 may be generated, e.g., on a different device, and be provided as part of machine-learning application 1230. In various implementations, the trained model 1234 may be provided as a data file that includes a model structure or form, and associated weights. Inference engine 1236 may read the data file for trained model 834 and implement a neural network with node connectivity, layers, and weights based on the model structure or form specified in trained model 1234.

Machine-learning application 1230 also includes a trained model 1234. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data 1232 or application data 1210. Such data can include, for example, one or more pixels per node, e.g., when the trained model is used for image analysis. Subsequent intermediate layers may receive, as input, output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, trained model 1234 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 1234 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 1232, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by machine-learning application 1230. In various implementations, a trained model includes a set of weights, or embeddings, corresponding to the model structure. In implementations where data 1232 is omitted, machine-learning application 1230 may include trained model 1234 that is based on prior training, e.g., by a developer of the machine-learning application 1230, by a third-party, etc. In some implementations, trained model 1234 may include a set of weights that are fixed, e.g., downloaded from a server that provides the weights.

Machine-learning application 1230 also includes an inference engine 1236. Inference engine 1236 is configured to apply the trained model 1234 to data, such as application data 1210, to provide an inference. In some implementations, inference engine 1236 may include software code to be executed by processor 1202. In some implementations, inference engine 1236 may specify circuit configuration (e.g., for a programmable processor, for a field programmable gate array (FPGA), etc.) enabling processor 1202 to apply the trained model. In some implementations, inference engine 1236 may include software instructions, hardware instructions, or a combination. In some implementations, inference engine 1236 may offer an application programming interface (API) that can be used by operating system 1208 and/or applications 1214 and/or 1216 to invoke inference engine 1236, e.g., to apply trained model 1234 to application data 1210 to generate an inference.

Machine-learning application 1230 may provide several technical advantages. For example, when trained model 1234 is generated based on unsupervised learning, trained model 1234 can be applied by inference engine 1236 to produce knowledge representations (e.g., numeric representations) from input data, e.g., application data 1210. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine 1236. In some implementations, knowledge representations generated by machine-learning application 1230 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 1230 may be implemented in an offline manner. In these implementations, trained model 1234 may be generated in a first stage, and provided as part of machine-learning application 1230. In some implementations, machine-learning application 1230 may be implemented in an online manner. For example, in such implementations, an application that invokes machine-learning application 1230 (e.g., operating system 1208, one or more of other applications 1214, etc.) may utilize an inference produced by machine-learning application 1230, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 1234, e.g., to update embeddings for trained model 1234.

In some implementations, machine-learning application 1230 may be implemented in a manner that can adapt to particular configuration of device 1200 on which the machine-learning application 1230 is executed. For example, machine-learning application 1230 may determine a computational graph that utilizes available computational resources, e.g., processor 1202. For example, if machine-learning application 1230 is implemented as a distributed application on multiple devices, machine-learning application 1230 may determine computations to be carried out on individual devices in a manner that optimizes computation. In another example, machine-learning application 1230 may determine that processor 1202 includes a GPU with a particular number of GPU cores (e.g., 1,000) and implement the inference engine accordingly (e.g., as 1,000 individual processes or threads).

In some implementations, machine-learning application 1230 may implement an ensemble of trained models. For example, trained model 1234 may include a plurality of trained models that are each applicable to same input data. In these implementations, machine-learning application 1230 may choose a particular trained model, e.g., based on available computational resources, success rate with prior inferences, etc. In some implementations, machine-learning application 1230 may execute inference engine 1236 such that a plurality of trained models is applied. In these implementations, machine-learning application 1230 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 1208 or one or more applications 1214 and/or 1216.

In different implementations, machine-learning application 1230 can produce different types of outputs. For example, machine-learning application 1230 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by the machine-learning application in response to input), audio or video (e.g., in response an input video, machine-learning application 1230 may produce an output video with a particular effect applied, e.g., rendered in a comic-book or particular artist's style, when trained model 1234 is trained using training data from the comic book or particular artist, etc. In some implementations, machine-learning application 1230 may produce an output based on a format specified by an invoking application, e.g. operating system 1208 or one or more applications 1214 and/or 1216. In some implementations, an invoking application may be another machine-learning application. For example, such configurations may be used in generative adversarial networks, where an invoking machine-learning application is trained using output from machine-learning application 1230 and vice-versa.

Any of software in memory 1204 can alternatively be stored on any other suitable storage location or computer-readable medium. In addition, memory 1204 (and/or other connected storage device(s)) can store one or more messages, one or more taxonomies, electronic encyclopedia, dictionaries, thesauruses, message data, grammars, user preferences, and/or other instructions and data used in the features described herein (e.g., such instructions and/or data can be included in application data 1210 in some implementations). Memory 1204 and any other type of storage (magnetic disk, optical disk, magnetic tape, or other tangible media) can be considered "storage" or "storage devices."

I/O interface 1206 can provide functions to enable interfacing the server device 1200 with other systems and devices. Interfaced devices can be included as part of the device 1200 or can be separate and communicate with the device 1200. For example, network communication devices, storage devices (e.g., memory and/or database 106), and input/output devices can communicate via I/O interface 1206. In some implementations, the I/O interface can connect to interface devices such as input devices (keyboard, pointing device, touchscreen, microphone, camera, scanner, sensors, etc.) and/or output devices (display device, speaker devices, printer, motor, etc.).

Some examples of interfaced devices that can connect to I/O interface 1206 can include a display device 1220 that can be used to display content, e.g., images, video, and/or a user interface of an output application as described herein. Display device 1220 can be connected to device 1200 via local connections (e.g., display bus) and/or via networked connections and can be any suitable display device. The display device 1220 can include any suitable display device such as an LCD, LED, or plasma display screen, CRT, television, monitor, touchscreen, 3-D display screen, or other visual display device. For example, display device 1220 can be a flat display screen provided on a mobile device, multiple display screens provided in a goggles device, or a monitor screen for a computer device.

The I/O interface 1206 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 12 shows one block for each of processor 1202, memory 1204, I/O interface 1206, and software blocks 1208, 1214, and 1216. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While some components are described as performing blocks and operations as described in some implementations herein, any suitable component or combination of components of environment 100, device 1200, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

In various implementations, described computer-implemented methods, systems, and/or computer-readable media enable obtaining an image at a device. For example, the image can be received by a device as a message over a communication network from a second device operated by a user. Based on the content of the image, one or more message suggestions are determined and displayed on a display device. For example, the message suggestions can be different message responses to the received image. In some examples, the message suggestions can be relevant to the content of the image, e.g., related to one or more image features depicted in the image. One or more of the message suggestions can be selected by user input to the device to cause a message derived from the selected message suggestion(s) to be transmitted to one or more recipient devices.

In various implementations, the obtained image can be processed by a concept identifier to determine one or more labels that describe one or more detected concepts present in the image. For example, concepts can be objects, actions, events, emotions, or other topics present in or related to the image content. The labels are used in one or more mapping models that determine message suggestions based on the labels.

For example, mapping models can use training message data including images sent to users and responses provided to those images in previous communications of users (if user consent has been obtained to use such data). The frequency of particular responses to particular concepts in images in previous occasions can be used to determine which responses are appropriate, e.g., the highest-frequency responses can be selected as message suggestions. In some implementations, the determined responses can be filtered based on associations of particular concepts with particular responses, such that responses that remain after the filtering are more specific to particular concepts and less generic and less appropriate to many different types of concepts. In some implementations, a graph is built from the message data, including nodes of concepts, images, and responses, where particular responses can be propagated through the graph to various different concepts that may be related to the responses or to images generating the responses.

Mapping models can also use defined grammars to determine message suggestions based on the labels. For example, grammars can be defined based on higher-level concepts in a referenced hierarchical taxonomy of concepts, where the grammar specifies a particular message suggestion for a particular high-level concept. A child concept of a parent concept defined in a grammar can make use of the message suggestion defined for the parent concept, because the child concept is hierarchically related to the parent concept.

In some implementations, one or more message responses can be determined to be commands or requests to bots, e.g., for information related to the obtained image. For example, if a user selects a message suggestion for a bot, the bot can be added to the message communication (e.g., conversation), output information in the message communication interface, receive additional messages from the users participating in the communication, etc.

In another example, at least one of the suggested responses is a command to invoke a bot program, where a representation of the bot program is added to a displayed interface of the message conversation, the bot program is configured to receive additional input via the displayed interface requesting information retrievable from one or more information sources by the bot program, and the command to invoke the bot program is determined in response to detecting keywords and/or phrases in the message conversation. In some examples, the suggested response can include image content and/or textual content.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-executed method to automatically provide suggestions in a messaging application, the computer-executed method comprising:
receiving one or more messages including a first image and a second image at a second device from a first device over a communication network;
programmatically analyzing the first image to extract a first image content;
retrieving a first semantic concept associated with the first image content;
programmatically analyzing the second image to extract a second image content;
retrieving a second semantic concept associated with the second image content;
programmatically generating a suggested response to the one or more messages, wherein the suggested response is based on the first semantic concept and the second semantic concept; and
transmitting a command to cause rendering of the suggested response in the messaging application on the second device.

2. The computer-executed method of claim 1, wherein the first semantic concept includes first text and the second semantic concept includes second text, and wherein the suggested response includes at least a portion of the first text from the first semantic concept and at least a portion of the second text from the second semantic concept.

3. The computer-executed method of claim 1, wherein the suggested response includes a suggested image, wherein the suggested image depicts a first feature related to the first semantic concept and a second feature related to the second semantic concept.

4. The computer-executed method of claim 1, further comprising:
upon receiving a selection of the suggested response based on input received at the second device, transmitting the suggested response over the communication network to the first device.

5. The computer-executed method of claim 1, further comprising:
detecting a first textual content within the one or more messages, wherein programmatically generating the suggested response is further based on the first textual content of the one or more messages.

6. The computer-executed method of claim 5, further comprising:
programmatically analyzing the first textual content to retrieve a third semantic concept,
wherein programmatically generating the suggested response to the one or more messages is further based on the third semantic concept.

7. The computer-executed method of claim 1, further comprising:
determining that a fourth semantic concept is associated with the first semantic concept; and
determining second textual content based on an association of the second textual content with the fourth semantic concept, wherein the suggested response includes the second textual content.

8. The computer-executed method of claim 1, wherein programmatically generating the suggested response further comprises:
determining a respective score for each of a plurality of suggested responses; and
selecting, based on the respective scores for the plurality of suggested responses, a particular response from the plurality of suggested responses as the suggested response.

9. The computer-executed method of claim 1, further comprising filtering previous user responses to a plurality of previous images such that filtered previous user responses are statistically associated with the plurality of previous images,
wherein programmatically generating the suggested response is based on the filtered previous user responses to the plurality of previous images.

10. The computer-executed method of claim 1, wherein retrieving the first semantic concept comprises querying a hierarchical taxonomy of concepts based on the first image content.

11. The computer-executed method of claim 1, wherein programmatically generating the suggested response comprises generating the suggested response using at least one of a graph-based learning model or one or more rules-based grammars.

12. The computer-executed method of claim 1, wherein the suggested response includes textual content, and further comprising:
determining that a particular semantic concept is associated with the first semantic concept based on a predetermined relationship between the first semantic concept and the particular semantic concept in a stored taxonomy; and
determining the textual content based on an association of the textual content with the particular semantic concept.

13. The computer-executed method of claim 1, wherein generating the suggested response includes determining the suggested response using a stored graph that indicates relationships between a plurality of concept nodes representing concepts, a plurality of image nodes representing images, and a plurality of response nodes representing responses, wherein the first semantic concept is matched to a first concept node and wherein the suggested response is determined based on strengths of connections between the first concept node and at least one of the response nodes.

14. The computer-executed method of claim 1, wherein generating the suggested response includes using a grammar-based model in which the first semantic concept is matched to one or more concepts in a stored taxonomy and one or more related concepts are determined in the stored taxonomy, and wherein the one or more related concepts are input to one or more stored grammars associated with the one or more related concepts in the grammar-based model to generate the suggested response.

15. A system to automatically suggest content in a messaging application comprising:
a memory storing instructions; and
at least one processor configured to access the instructions in the memory to perform operations comprising:
receiving one or more messages including a first image and a second image at a second device from a first device over a communication network;
posting, within the messaging application displayed on a second device, the one or more messages including the first image and the second image transmitted by the first device;
programmatically generating a suggested response to the one or more messages, the suggested response generated based on a first semantic concept associated with a first image content in the first image and a second semantic concept associated with a second image content in the second image; and
transmitting a command to cause rendering of the suggested response in the messaging application as a suggested response to the one or more messages.

16. The system of claim 15 wherein the at least one processor is configured to perform additional operations comprising:
receiving a selection of the suggested response in the messaging application based on user input provided via the second device; and
transmitting the selected suggested response to the first device.

17. The system of claim 15, wherein the first semantic concept and the second semantic concept each include text, and wherein the suggested response includes the text from the first semantic concept and the text from the second semantic concept.

18. The system of claim 15, wherein the suggested response includes a suggested image rendered in the messaging application, wherein the suggested image depicts a first feature related to the first semantic concept and a second feature related to the second semantic concept.

19. A non-transitory computer readable medium having stored thereon software instructions that, when executed by a processor, cause the processor to automatically suggest content in a messaging application by performing operations including:
receiving one or more messages including a first image and a second image at a second device from a first device over a communication network;
posting, within the messaging application displayed on a second device, the one or more messages including the first image and the second image;

programmatically generating one or more suggested responses to the one or more messages, the one or more suggested responses each generated based on a first semantic concept associated with a first image content in the first image and a second semantic concept associated with a second image content in the second image;

transmitting a command to cause rendering of at least one suggested response of the one or more suggested responses in the messaging application;

receiving a selection of a selected suggested response of the at least one suggested response in the messaging application based on user input via the second device; and in response to receiving the selection of the selected suggested response, transmitting the selected suggested response over the communication network to the first device as a response to the one or more messages.

20. The non-transitory computer readable medium of claim 19, wherein a particular suggested response of the one or more suggested responses includes at least one of:

first text from the first semantic concept and second text from the second semantic concept; or a suggested image that depicts a first feature representing the first semantic concept and a second feature representing the second semantic concept.

* * * * *